(12) United States Patent
Vivalda et al.

(10) Patent No.: US 9,830,402 B2
(45) Date of Patent: *Nov. 28, 2017

(54) SYSTEMS, DEVICES, AND METHODS FOR GENERATION OF CONTEXTUAL OBJECTS MAPPED BY DIMENSIONAL DATA TO DATA MEASURES

(71) Applicant: DECISYON, INC., Stamford, CT (US)

(72) Inventors: Antonio Vivalda, Latina (IT); Fabrizio Del Franco, Latina (IT); Simone Costantini, Velletri (IT); Alessandro Pratico, Latina (IT); Franco Petrucci, Sabaudia (IT)

(73) Assignee: Decisyon, Inc., Stamford, CT (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/738,681

(22) Filed: Jun. 12, 2015

(65) Prior Publication Data

US 2015/0278392 A1    Oct. 1, 2015

Related U.S. Application Data

(63) Continuation of application No. 14/202,649, filed on Mar. 10, 2014, now Pat. No. 9,081,845, which is a
(Continued)

(51) Int. Cl.
*G06F 17/30* (2006.01)

(52) U.S. Cl.
CPC .. *G06F 17/30914* (2013.01); *G06F 17/30592* (2013.01)

(58) Field of Classification Search
CPC ......... G06F 17/30592; G06F 17/30489; G06F 17/30398; G06F 17/30395;
(Continued)

(56) References Cited

U.S. PATENT DOCUMENTS 6,438,566 B1    8/2002  Okuno et al.
7,039,569 B1    5/2006  Haws et al.
(Continued)

OTHER PUBLICATIONS

International Search Report and Written Opinion for International Application No. PCT/US2014/023753, dated Aug. 26, 2014, in 11 pages.
(Continued)

*Primary Examiner* — Augustine K Obisesan
(74) *Attorney, Agent, or Firm* — Knobbe Martens Olson & Bear, LLP

(57) ABSTRACT

This disclosure in part describes systems, devices, and methods for implementing a unification mechanism that enables the unification of various data sets, which can permit greater collaboration between users of a data management platform. For example, a system can be configured to enable a user to add or associate a contextual object with a data measure. In associating the contextual object with the data measure, the system can store the contextual object with the unique dimension coordinates that are associated with data measure. Other users of the system may, in turn, access the data measure and be shown the contextual object associated with the data measure.

20 Claims, 20 Drawing Sheets

Related U.S. Application Data continuation of application No. 14/102,059, filed on Dec. 10, 2013, now Pat. No. 8,719,217.

(60) Provisional application No. 61/790,087, filed on Mar. 15, 2013, provisional application No. 61/874,943, filed on Sep. 6, 2013.

(58) Field of Classification Search
CPC ......... G06F 17/30554; G06F 17/30914; G06F 17/30539; G06F 21/6227; Y10S 707/99935; Y10S 707/99934; Y10S 707/99944; Y10S 707/99945; Y10S 707/99933; Y10S 707/99942; Y10S 707/958; Y10S 707/96; G06Q 10/06
See application file for complete search history.

(56) References Cited

U.S. PATENT DOCUMENTS

| | | | |
|---|---|---|---|
| 7,072,940 B1 | 7/2006 | Day et al. | |
| 7,386,535 B1 | 6/2008 | Kalucha et al. | |
| 7,925,985 B2 | 4/2011 | Moore | |
| 8,407,664 B2 | 3/2013 | Moosmann et al. | |
| 2002/0154120 A1 | 10/2002 | Cullimore et al. | |
| 2004/0187140 A1 | 9/2004 | Aigner et al. | |
| 2005/0097440 A1 | 5/2005 | Lusk et al. | |
| 2005/0203876 A1 | 9/2005 | Cragun et al. | |
| 2005/0256825 A1 | 11/2005 | Dettinger et al. | |
| 2006/0004885 A1 | 1/2006 | Lubashev et al. | |
| 2006/0242581 A1 | 10/2006 | Manion et al. | |
| 2007/0022093 A1* | 1/2007 | Wyatt | G06F 17/30592 |
| 2008/0034283 A1 | 2/2008 | Gragun et al. | |
| 2008/0091706 A1 | 4/2008 | Suzuki et al. | |
| 2008/0115083 A1 | 5/2008 | Finkelstein et al. | |
| 2008/0147718 A1 | 6/2008 | Dettinger et al. | |
| 2008/0168078 A1* | 7/2008 | Francis | G06F 17/30457 |
| 2008/0222512 A1 | 9/2008 | Albornoz et al. | |
| 2008/0256062 A1 | 10/2008 | Dettinger et al. | |
| 2008/0256172 A1 | 10/2008 | Hebert et al. | |
| 2008/0288889 A1 | 11/2008 | Hunt et al. | |
| 2009/0070350 A1 | 3/2009 | Wang | |
| 2009/0083216 A1* | 3/2009 | Dampier | G06F 17/30592 |
| 2009/0089682 A1 | 4/2009 | Baier et al. | |
| 2009/0234876 A1 | 9/2009 | Schigel et al. | |
| 2010/0058166 A1 | 3/2010 | Chikyu | |
| 2010/0114862 A1 | 5/2010 | Young et al. | |
| 2010/0250530 A1* | 9/2010 | Wang | G06F 17/30707 707/732 |
| 2010/0268103 A1 | 10/2010 | McNamara et al. | |
| 2010/0287195 A1 | 11/2010 | Geurts et al. | |
| 2010/0309228 A1* | 12/2010 | Mattos | G06F 1/1626 345/654 |
| 2011/0125744 A1* | 5/2011 | Immonen | G06F 17/30241 707/737 |
| 2012/0023109 A1* | 1/2012 | Sternemann | G06F 17/30592 707/748 |
| 2012/0066204 A1 | 3/2012 | Ball et al. | |
| 2012/0084250 A1 | 4/2012 | Gundorov et al. | |
| 2012/0112997 A1 | 5/2012 | Becerra et al. | |
| 2012/0259901 A1 | 10/2012 | Lee et al. | |
| 2013/0061155 A1 | 3/2013 | Hon | |
| 2013/0159926 A1 | 6/2013 | Vainer et al. | |
| 2014/0279832 A1 | 9/2014 | Vivalda et al. | |

OTHER PUBLICATIONS

International Search Report and Written Opinion for International Application No. PCT/US2014/072833, dated Mar. 27, 2015, in 9 pages.

* cited by examiner

SYSTEMS, DEVICES, AND METHODS FOR GENERATION OF CONTEXTUAL OBJECTS MAPPED BY DIMENSIONAL DATA TO DATA MEASURES

INCORPORATION BY REFERENCE TO ANY PRIORITY APPLICATIONS

This application is a continuation of U.S. patent application Ser. No. 14/202,649, filed Mar. 10, 2014, entitled "SYSTEMS, DEVICES, AND METHODS FOR GENERATION OF CONTEXTUAL OBJECTS MAPPED BY DIMENSIONAL DATA TO DATA MEASURES," which is a continuation of U.S. patent application Ser. No. 14/102,059, filed Dec. 10, 2013, entitled "SYSTEMS, DEVICES, AND METHODS FOR GENERATION OF CONTEXTUAL OBJECTS MAPPED BY DIMENSIONAL DATA TO DATA MEASURES," which claims the benefit under 35 U.S.C. §119(c) of U.S. Provisional Application No. 61/874,943, filed Sep. 6, 2013, entitled "SYSTEMS, DEVICES, AND METHODS FOR DATA MANAGEMENT, PRESENTATION, AND COLLABORATION," and U.S. Provisional Application No. 61/790,087, filed Mar. 15, 2013, entitled "COLLABORATIVE DECISION MAKING AND EXECUTION PLATFORM THEREFOR." All of the foregoing applications are hereby incorporated herein by reference in their entirety under 37 C.F.R. §1.57.

BACKGROUND

Field

The embodiments of this disclosure generally relate to data measures in collaboration systems, and more particularly to systems, devices, and methods for the efficient management and display of data to enable collaboration systems.

Description of the Related Art

With the development of new information technologies, users and organizations are creating vast amounts of data. Such data is usually stored in various databases that are often separated into distinct silos. The storage of such data in separate silos often makes it difficult to share data between users and/or between organizations. The difficulty in sharing data inhibits the ability of users and/or organizations to collaborate efficiently. Accordingly, collaborative software systems, also known as groupware, have been developed and designed to help individuals share data in order to collaborate and achieve common tasks and/or goals.

SUMMARY

In an embodiment, a method for facilitating collaboration between users of a plurality of user terminals around a data measure mapped to a multi-dimensional data model is described. The method can include: electronically processing, by a computer system, a request from a first user terminal of a plurality of user terminals to associate a contextual object with a data measure mapped to a multi-dimensional data model, the contextual object enabling users of the plurality of user terminals to interact based on the data measure, the multi-dimensional data model configured for access by online analytical processing (OLAP) applications; determining, by the computer system, coordinates of a plurality of data dimensions of the multi-dimensional data model that uniquely identify the data measure; storing, by the computer system, in an electronic data storage the contextual object in association with the coordinates of the plurality of data dimensions of the multi-dimensional data model that uniquely identify the data measure; retrieving, by the computer system, the contextual object from the electronic data storage using the coordinates of the plurality of data dimensions of the multi-dimensional data model that uniquely correspond to the data measure based on a request from a second user terminal of the plurality of user terminals for a plurality of data measures including the data measure; transmitting, by the computer system, to the second user terminal an indication of the contextual object for display by the second user terminal in association with a value of the data measure; and transmitting, by the computer system, to the second user terminal the contextual object in response to a request for the contextual object from the second user terminal, wherein the computer system comprises a computer processor and electronic memory.

The method of the preceding paragraph can include one or more of the following features: The contextual object can include a discussion object or a task object. The value of the data measure can be configured to vary over time based on a measured value indicative of performance of a business entity; and the method can further include transmitting the value of the data measure to the second terminal at a first time and transmitting the value of the data measure to the second terminal at a second time after the first time when the value of the data measure has changed. The transmitting to the second user terminal the indication can include transmitting to the second user terminal the indication of the contextual object to cause the second user terminal to display, on a user interface displayed on a display, the indication of the contextual object (1) in juxtaposition with the value of the data measure, (2) at a position within a maximum distance from the value of the data measure, or (3) within the same cell of a report as the value of the data measure. The retrieving the contextual object and the transmitting to the second user terminal the indication can be performed in response to determining that a second user of the second user terminal is permitted to view a value of the data measure. The multi-dimensional data model can include at least three dimensions. The method further includes retrieving, by the computer system, the data measure from the data storage based on the request from the second user terminal for the plurality of data measures, the data measure stored in a relational database structure. The retrieving further can include retrieving the contextual object in response to determining, by the computer system, that the second terminal is displaying a value of the data measure on a user interface displayed on a display. The method can further include: electronically processing, by the computer system, a request from the second user terminal to associate a different contextual object with the data measure; and storing, by the computer system, in the electronic data storage the different contextual object in association with the coordinates of the plurality of data dimensions of the multi-dimensional data model that uniquely identify the data measure.

In an embodiment, a method for facilitating collaboration between users of a plurality of user terminals is disclosed. The method can include: electronically processing, by a computer system, a request from a first user terminal of a plurality of user terminals to associate a discussion object with a data measure mapped to a multi-dimensional data model, the discussion object including a first entry by a first user and enabling users of the plurality of user terminals to communicate based on the data measure, the multi-dimensional data model configured for access by online analytical processing (OLAP) applications; determining, by the computer system, coordinates of a plurality of data dimensions of the multi-dimensional data model that uniquely identify to the data measure; storing, by the computer system, in an electronic data storage the discussion object in association with the coordinates of the plurality of data dimensions of the multi-dimensional data model that uniquely identify the data measure; retrieving, by the computer system, the discussion object from the data storage using the coordinates of the plurality of data dimensions of the multi-dimensional data model that uniquely correspond to the data measure based on a request from a second user terminal of the plurality of user terminals for a plurality of data measures including the data measure; transmitting, by the computer system, to the second user terminal an indication of the discussion object for display by the second user terminal in association with a value of the data measure; transmitting, by the computer system, to the second user terminal the discussion object in response to a request for the discussion object from the second user terminal; and updating, by the computer system, the discussion object stored in the electronic data storage with a second entry by a second user based on a request to update the discussion object from the second user terminal, wherein the computer system comprises a computer processor and electronic memory.

The method of the preceding paragraph can include one or more of the following features: The method can further include transmitting, by the computer system, to the first user terminal an indication of the updated discussion object for display by the first user terminal in association with the value of the data measure; and transmitting, by the computer system, to the first user terminal the updated discussion object in response to a request for the updated discussion object from the first user terminal to cause the first user terminal to display the first entry and the second entry on a user interface displayed on a display. The first entry can include text input by the first user and a link to a different object. The method can further include, in response to determining that the first entry includes a link to a different object, transmitting, by the computer system, to the second user terminal a list of objects linked to the first entry to cause the second user terminal to display the list on a user interface displayed on a display, the list including the different object. The link can include a navigable link that when selected, as a result of an input by the first user, causes the display to display contents of the different object. The first entry can include text input by the first user, a link to a task object, a link to a report, and a link to a user social space.

In an embodiment, a method for facilitating collaboration between users of a plurality of user terminals is described. The method can include: electronically processing, by a computer system, a request from a first user terminal of a plurality of user terminals to associate a task object with a data measure mapped to a multi-dimensional data model, the task object assigning a task command of the task object to a user of the plurality of user terminals, the task command providing task instructions for the user associated with a value of the data measure, the multi-dimensional data model configured for access by online analytical processing (OLAP) applications; determining, by the computer system, coordinates of a plurality of data dimensions of the multi-dimensional data model that uniquely identify to the data measure; storing, by the computer system, in an electronic data storage the task object in association with the coordinates of the plurality of data dimensions of the multi-dimensional data model that uniquely identify the data measure; retrieving, by the computer system, the task object from the electronic data storage using the coordinates of the plurality of data dimensions of the multi-dimensional data model that uniquely correspond to the data measure based on a request from a second user terminal of the plurality of user terminals for a plurality of data measures including the data measure; transmitting, by the computer system, to the second user terminal an indication of the task object for display by the second user terminal in association with a value of the data measure; and transmitting, by the computer system, to the second user terminal the task object in response to a request for the task object from the second user terminal to cause the second user terminal to display, on a user interface displayed on a display, the task instructions of the task object to a second user of the second user terminal, wherein the computer system comprises a computer processor and electronic memory.

The method of the preceding paragraph can include one or more of the following features: The transmitting to the second user terminal the task object can include transmitting to the second user terminal the task object to cause the second user terminal to update a task list for the second user with the task command. The value of the data measure can be configured to vary over time, and the task object can be configured to alert the user to perform the task based on a comparison between the value of the data measure and a threshold.

BRIEF DESCRIPTION OF THE DRAWINGS

The foregoing and other features, aspects, and advantages of the present invention are described in detail below with reference to the drawings of various embodiments, which are intended to illustrate and not to limit the invention. The drawings comprise the following figures in which.

DETAILED DESCRIPTION

Figure 1:
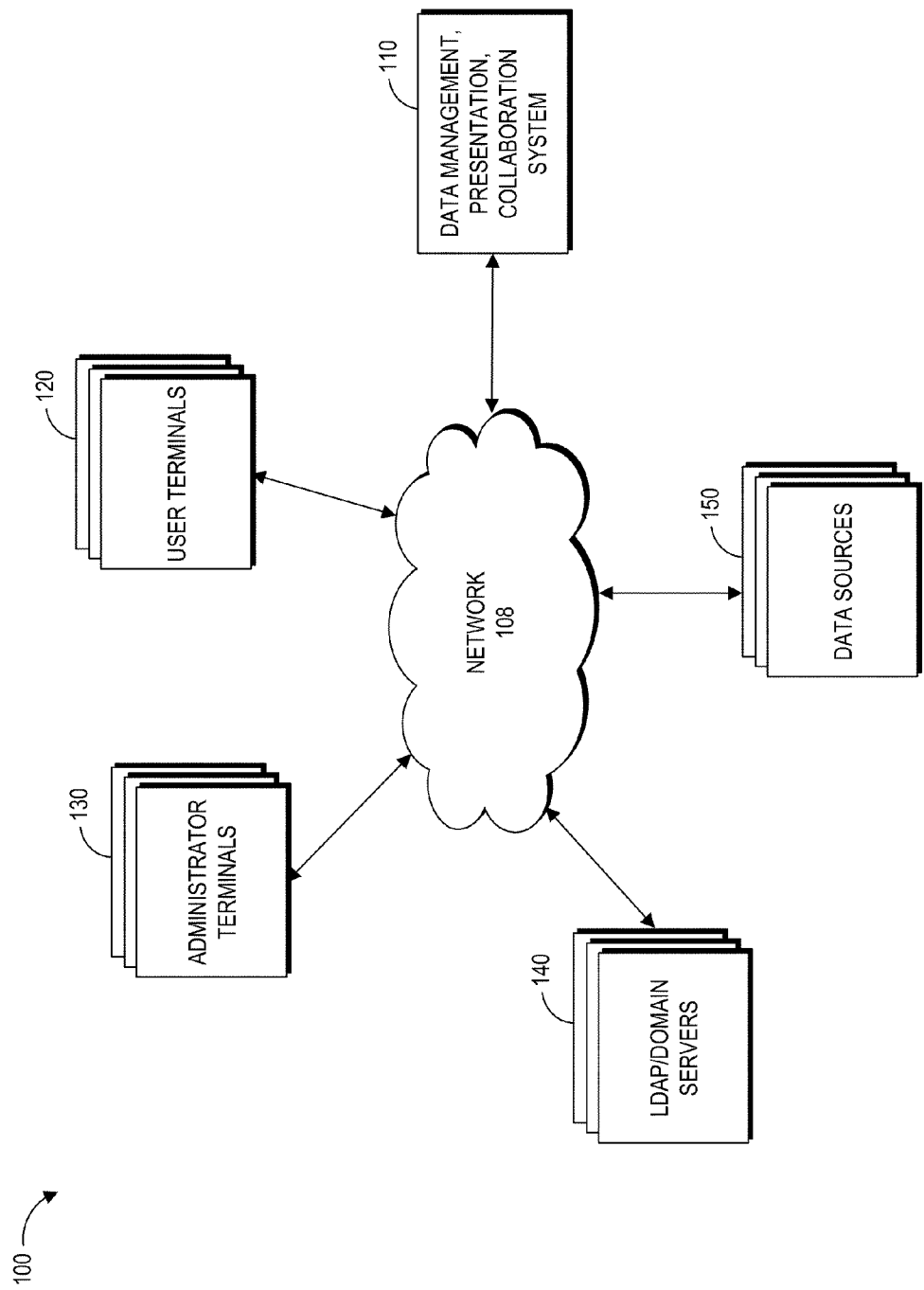
FIG. 1 depicts an embodiment of a computing environment that facilitates collaboration between multiple users or entities.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

There are many kinds of collaboration software, and each type of collaboration software generally addresses a particular collaboration task. For example, there are collaboration software packages that support project management functions, such as assigning tasks, managing time deadlines, and/or calendar sharing. Other collaboration software packages allow users to share documents/data, and/or to search for related documents/data.

The use of collaboration software in the workplace can be advantageous in creating a more collaborative work environment wherein employees can better share data and interact with each other in order to achieve a common goal more efficiently and/or more quickly. However, some collaboration software packages only address particular collaboration functions. Accordingly, there is a need for a collaboration software system that combines several collaboration functions into a single software package. However, the combining of various collaboration functions into a single software package is challenging without a mechanism for the unification of data objects in such a way that users can more easily share data and provide additional insight that relate to such data.

In general, collaboration software can be quite advantageous in a work environment. In particular, collaboration software can enable employees and other users to exchange data and share documents and provide relevant insight. However, in many circumstances, a company or other organization must employ a plurality of collaboration software tools in order to facilitate collaboration between various users. The utilization of a number of disparate collaboration tools can create inefficiencies in the collaboration process. Accordingly, it can be advantageous to have a single collaboration software package that combines the functionality of various other separate collaboration tools. The disclosure herein provides systems, devices, and methods for providing such a collaboration software package that combines the functionality of various collaboration tools.

For example, the embodiments disclosed herein can combine into a single collaboration system enterprise resource planning software tools, collaboration tools, and analytical tools. Specifically, the system can comprise enterprise resource planning tools that are configured to allow an organization to track business resources such as cash, materials, production capacity, and the like, and correlate such information to business commitments, such as orders, purchase orders, shipments, payroll, and the like. This system can be configured to share such data across various departments, such as sales, accounting, manufacturing, and the like, by providing collaboration and sharing tools to facilitate the sharing of such data across departments. The system can also comprise analytical tools for analyzing the data from the enterprise resource planning in order to generate predictions and/or recommendations for users to consider for implementation.

In general, the combining of various collaboration tools into a single collaboration tool package can be advantageous; however, the combination of such collaboration tools can present certain challenges. In particular, there is a need for a unification mechanism that enables various disparate data sets to be unified in a single system. Further, the combination of collaboration tools in itself can only increase the efficiency for collaboration up to a point. Accordingly, there is a need for enabling users to collaborate using different collaboration tool sets in order to further increase the efficiency of collaboration between users. The disclosure herein provides systems, devices, and methods for implementing a unification mechanism that enables the unification of various data sets in such a way that allows for the creation of new collaboration tools that permit greater collaboration between various users.

In an embodiment, the system can be configured to store data, also known as data measures, in for example a relational database. One of ordinary skill in the art will appreciate that other database systems can also be employed with the systems disclosed herein. In an embodiment, the system can be configured to associate with each data measure a unique set of data dimension labels, also known as metadata elements or data dimension coordinates. The combination of data measures with unique data dimension elements/coordinates can form objects, also known as bricks, that the system can utilize to combine with other objects or bricks. The combination of bricks or objects with other bricks or objects can be completed in such a way to create hyperapps. Objects or bricks are combinable with other objects or bricks because bricks are configured to provide access to the data within the object to other objects. For example, the system can be configured to combine a first data measure showing product sales by salesperson with a second data measure showing product sales in a particular sales region by salesperson. The combination of the first data measure and the second data measure can create a reporting table, and such a reporting table can be known as a hyperapp. Other types of hyperapps are possible, and include but are not limited to data reports where one may add or combine different functional dimensions or objects.

The system can be configured to combine multiple hyperapps. For example, the system can be configured to display a first hyperapp that displays a report table application in combination with a second hyperapp that displays a pie chart report. The combination of hyperapps is known as a mash or mashboard.

In an embodiment, the system can be configured to enable users to customize and/or combine various hyperapps in a particular way or format that is most suitable for the user. The combination of various hyperapps in a single user display view can allow the user to create a social space. In the social space, a user can collaborate with other users by, for instance, reviewing or analyzing data important to one or more organizations and communicating with other users about the data to facilitate a successful understanding, planning, or executing of organizational objectives. The social space may enable efficient collaboration among users by displaying data in juxtaposition to and/or in the context of one or more user communications.

Furthermore, a social space can display data to a user is most relevant to the job functions of the user. The ability for a user to control and customize the layout of a user's social space enables data to be presented such that the user can be more productive and can better collaborate with others. In an embodiment, the system can be configured to allow for different social spaces for each employee within an organization. By allowing employees to design and create and position data measures within a user's particular social space, the user can collaborate more effectively with other employees because the data is displayed in a unique manner that is best suitable for the employee in order to allow the employee to do a more effective job. In an embodiment, the system is configured to allow a first user to view the social space of a second user in order to allow the first user to view and analyze the data from the perspective of the second user. By allowing the first user to view the data from second user's perspective and job function responsibilities, the first user can obtain greater insight into the data and can more easily collaborate with the second user.

In an embodiment, the system can be configured to enable the user to add or associate a contextual object (for example, in some embodiments, a data structure together with associated processing routines) with a particular data measure that is shown on the user's social space or on a different user's social space. For example, in an embodiment, the system can be configured to allow a user to click on a data measure to add a contextual object in such a way that the contextual object is mapped to the data measure. This collaboration tool for adding contextual objects to a data measure is enabled by the system's unique mechanism for the unification of data objects. Specifically, each data measure is associated with data dimension coordinates when the data measure is stored in a database. The system utilizes the data dimension coordinates as a mechanism for the unification of data objects within the system.

The system can be configured to use the data dimension coordinates of a data measure in order to allow a user to associate a contextual object with the data measure. In associating a contextual object with a data measure, the system can be configured to store in an electronic database the new contextual object with the unique dimension coordinates that are associated with data measure. In other words, the data measure and the newly created contextual object will have the same dimension data coordinates in order to link the contextual object with the data measure when the data measure is displayed to a user.

The ability to associate a contextual object with a data measure is a very unique and powerful collaboration tool because it allows users to not merely share data but rather the system allows users to share insight that is relevant to the data element at issue in real time as a user is analyzing the data. In an embodiment, the system is able to capture and record the user's insight about the data whether or not the user is engaged with other users at the moment. Accordingly, the system allows for asynchronous collaboration between users. In other words, users need not collaborate in real-time but rather can collaborate asynchronously. Users may share insight by adding discussion comments or by discussing the data through a micro-blog.

Further, the ability to associate a contextual object with a data measure allows users to create and track tasks for utilizing the data. In other words, there is no need to launch a separate project management software system to separately create and track tasks associated with the data measure. Additionally, the ability to associate a contextual object with a data measure allows users to share and link other data that may be relevant to the data measure at issue. Accordingly, a user need not launch a separate document management system to search for a relevant document in order to analyze the document. Also, the ability to associate a contextual object with a data measure allows users to be notified through a signal alert when the data measure has changed or has reached a threshold level that may be of interest to a user. The ability to associate a signal with a data measure enables a user to simply review the user's social space to determine whether the data measure has changed. In other words, the user need not open a separate document to analyze the data measure in order to determine if the data measure has changed. Rather, in an embodiment, the user can monitor a single view generated from a single collaboration system to determine changes in the data measure, and can analyze the changes in the data measure in the context of other relevant data measures that the user has positioned on the user's social page.

In an embodiment, any user that possesses the appropriate security access to the data measure may also be shown the contextual object associated with the data measure. In an embodiment, the system can be configured to allow a discussion contextual object or a task contextual object to be associated with a particular data measure. In an embodiment, the discussion contextual object and the task contextual object can be configured to add additional contextual objects within such discussion or task contextual objects. For example, the system can be configured to allow document contextual objects and user identifier contextual objects to be added or embedded into a discussion contextual object or a task contextual object. In an embodiment, the system can be configured to associate with a data measure any type of contextual object, for example, discussion contextual objects, task contextual objects, document contextual objects, and signal contextual objects, or the like.

In an embodiment, a discussion contextual object is an object that allows user to add comments and discuss issues relating to the associated data measure. In an embodiment, a task contextual object is an object that allows users to assign and track tasks associated with a particular data measure. In an embodiment, a document contextual object is an object that allows a user to object a document associated with a data measure, a discussion contextual object, and/or a task contextual object. In an embodiment, a blog contextual object is an object that allows a user to open a blog associated with a data measure, a discussion contextual object, and/or a task contextual object.

An example of enabling a user to associate a contextual object with a particular data measure is, the system can be configured to receive a request from a user to associate a contextual object with a particular data measure. For example, the system can be configured to allow a user to click on a data measure and select a contextual object to associate with the data measure. In an embodiment, the system can be configured to determine the data dimension coordinates associated with the data measure selected by the user. For example, a data measure that shows the number of sales made by a particular user in a particular region as shown on a particular report can comprise at least three data dimension labels. In particular, the three data dimension labels are: (1) salesperson; (2) number of sales; and (3) region. The title of the particular report can be considered a context of the dimension labels. The system can be configured to map the determined data dimension coordinates associated with the selected data measure to the contextual object that the user wishes to associate with the particular data measure. For example, the system can be configured to associate with a discussion contextual object with the three data dimension coordinates determined for the particular data measure.

In an embodiment, the system can be configured to store the association between the discussion contextual object and the data dimension coordinates in a database. In an embodiment, the system can be configured to show the data measure to other users of the system. In displaying the data measure to other users, the system can be configured to utilize an OLAP coordinator to determine whether there are contextual objects associated with a particular data measure. Based on a determination by the OLAP coordinator, the system can be configured to show contextual objects associated with a particular data measure. For example, in displaying a data measure to a second user, the system can be configured to determine that the particular data measure should be shown in conjunction with a contextual object that was generated by a first user.

In an embodiment, the OLAP coordinator can be configured to determine the data dimension coordinates associated with a particular data measure and utilize those data dimension coordinates to lookup in a database to determine whether the particular data dimension coordinates are associated with one or more contextual objects. If the system determines that there are contextual objects associated with such a unique combination of data dimension coordinates, the system can be configured to show the contextual objects in conjunction with the data measure to a second user.

In an embodiment, the system can be configured to allow users to generate signal contextual objects. In an embodiment, signal contextual objects can be configured to alert a user based on whether a particular data measure reaches a parameter level and/or threshold level. In an embodiment, the system can be configured to allow a user to generate a signal contextual object such that the signal contextual object is displayed to the user and a plurality of other users without any criteria for showing the alert. For example, the system can be configured to allow a user to associate a signal contextual object with a particular data measure showing sales in a particular region by a particular person.

In an embodiment, the signal contextual object can be configured to generate an alert based on whether the particular data measure reaches a particular sales level. If the threshold level is met or exceeded for the particular data measure, the system can be configured to generate an alert to the user. For example, the system can be configured to generate an alert that is shown on the user's social space. In an embodiment, the system can be configured to generate a signal contextual object that is not based on any satisfaction of a threshold level. For example, the system can be configured to generate a signal contextual object that always alerts a user to a particular data measure, whether or not a threshold level was satisfied or exceeded for a particular data measure. In an embodiment, the system can be configured to show a signal contextual object on a user's social space. The user can click on the signal contextual object and the system will show the data measure associated with the signal contextual object. In an embodiment, the system can be configured to show the signal contextual object to any user of the system that has the security clearance to view the particular data measure.

In an embodiment, the system can be configured to track a workflow of a process in an organization. For example, the system can be configured to display to the user a graphical representation of the steps in the workflow. In an embodiment, the system can be configured to identify which steps in the workflow process have been completed and which steps have not been completed. The system can also be configured to allow a user to select each step in the workflow process, and by selecting the desired step, the system can be configured to display to the user a social space, wherein all of the data relevant for completing the step in the workflow processes is displayed. In an embodiment, the system is configured to allow the user to interact with the social space using any of the methods described above. For example, the system can be configured to allow the user to associate a contextual object with a data measure that is displayed in the social space that is linked to a process step in a workflow. In an embodiment, the workflow process step can be utilized as a dimension coordinate for association with a contextual object. In an embodiment, the system is configured to treat each step in a workflow process as an object or brick. In other words, each step in a workflow process is a data measure that can be configured to be associated with dimensional coordinate data.

FIG. 1 depicts a computer environment 100 that facilitates management of disparate data sets for an organization and interactions between multiple users or entities of the organization or a plurality of organizations. The computing environment 100 includes a data management, presentation, and collaboration system 110 (hereafter, system 110) configured to function as a data hub and application platform for an organization, such as a business. The system 110 can manage the collective intelligence of the organization. In addition, the computing environment 100 includes the user terminals 120, administrator terminals 130, LDAP/domain servers 140, and data sources 150 that can be configured to access or provide information to the system 110. The various components of the computing environment 100 can communicate with one another via the network 108. Although the system 110 may be described in one or more of the following examples as functioning in the context of a single organization, the system 110 can, in some embodiments, be used to communicate data between multiple organizations, such as between a business, the business' suppliers, and the business' clients.

The system 110 can function as a data manager for data of the organization. The system 110 can collect and store information, such as structured data (for example, data having a pre-defined data model or organized in a pre-defined manner) and unstructured data (for example, data not having a pre-defined data model or not organized in a pre-defined manner, such as word processing documents, email messages, pictures, or the like), from a variety of sources. The user terminals 120 and administrator terminals 130, for instance, can input and edit information saved by the system 110. The data sources 150 can gather and provide information related to the internal operations of the organization, as well as other information derived from outside the organization that can provide context or details relevant to internally gathered information.

The system 110 can also function as a platform for individuals of the organization to flexibly work with the data and interact with other individuals of the organization. For example, the system 110 can analyze data to develop information usable for providing intelligence about the organization. The users of the user terminals 120 can view the intelligence provided by the system 110 via the user terminals 120 to assist with planning of strategy and operations of the organization. The administrators or users can customize and adjust the presentation of information to fit the roles of various users in the organization. Moreover, the users can cause the system 110 to associate contextual objects with data presented to the user terminals 120 by the system 110. As a result of this association, the system 110 can drive collaboration around the data managed by the system 110 and between the user terminals 120.

The system 110 can provide data and display information to the user terminals 120 via the network 108. The user terminals 120 can, in turn, process the received data and display the information by one or more user interfaces to users of the user terminals 120. The users can examine the information from the system 110 displayed by the terminals 120 to access integrated data about the organization. For example, the users can review the information to make more informed decisions based on past business decisions. The users can analyze the information to determine a course of action or understand links between various data and decisions by the organization.

The user terminals 120, in addition, can enable the users to control the information provided by the system 110 and to interact with other user terminals 120. A user of a particular user terminal, for example, may request that the system 110 transmit certain data to populate a report relevant to the user. In response to the request, the system 110 can retrieve the requested data and display information (for example, metadata) relevant to the report. The system 110 can transmit the data and display information to the requesting user terminal so that the requested report may be displayed on the user terminal. The user can interact with the displayed report, for instance, by adjusting what data is displayed and how data is displayed (for example, by controlling the consolidation, drill-down, and/or slicing or dicing of the data). Moreover, the user can input information via interaction with the report that can be provided to the system 110 and subsequently shared by the system 110 with one or more users of other user terminals 120. Through this shared communication between the user terminals 120, users can collaborate based on data managed by the system 110, enhance the collective intelligence of the organization, and increase the ease with which information can be passed in the organization. Advantageously, in some embodiments, this approach can enable the users of the user terminals 120 to communicate through the system 110 without resorting to communication via other mediums, such as by email or chat services separate from the system 110 that can manage data for the organization.

The administrator terminals 130 can be used by administrators, such as IT professionals, to control development and administration of the system 110. The administrators, for example, may rely on the administrator terminals 130 to map a database structure of the system 110, create metrics or filters, generate reports, manage data and system security, create and manage users, manage performance, define the organizational hierarchy, develop applications and components of applications, construct mashboards, or the like.

The data sources 150 can represent numerous different data sources that may communicate with components of the computing environment 100, such as the system 110. The data sources 150 can, for example, include one or more of: a document search server, semantic engine, enterprise data warehouse, data mart, flat file, Excel file, XML file, filer or file system, operational database management system, web server, enterprise resource planning system, customer relationship management system, social networking websites, or the like. The data sources 150 can supply the system 110 with at least some of the data stored and managed by the system 110.

The network 108 of the computer environment 100 can include a LAN (Local Area Network), WAN (Wide Area Network), or the Internet, for instance. The components of the computer environment 100, for example, can be connected to the network 108 via a wired, wireless, or combination of wired and wireless, communication link. The network 108 can connect the various computing devices and/or other electronic devices via wired or wireless communication links. The LDAP/domain servers 140 can provide directory features and/or domain name mapping for at least the network 108.

Figure 2:
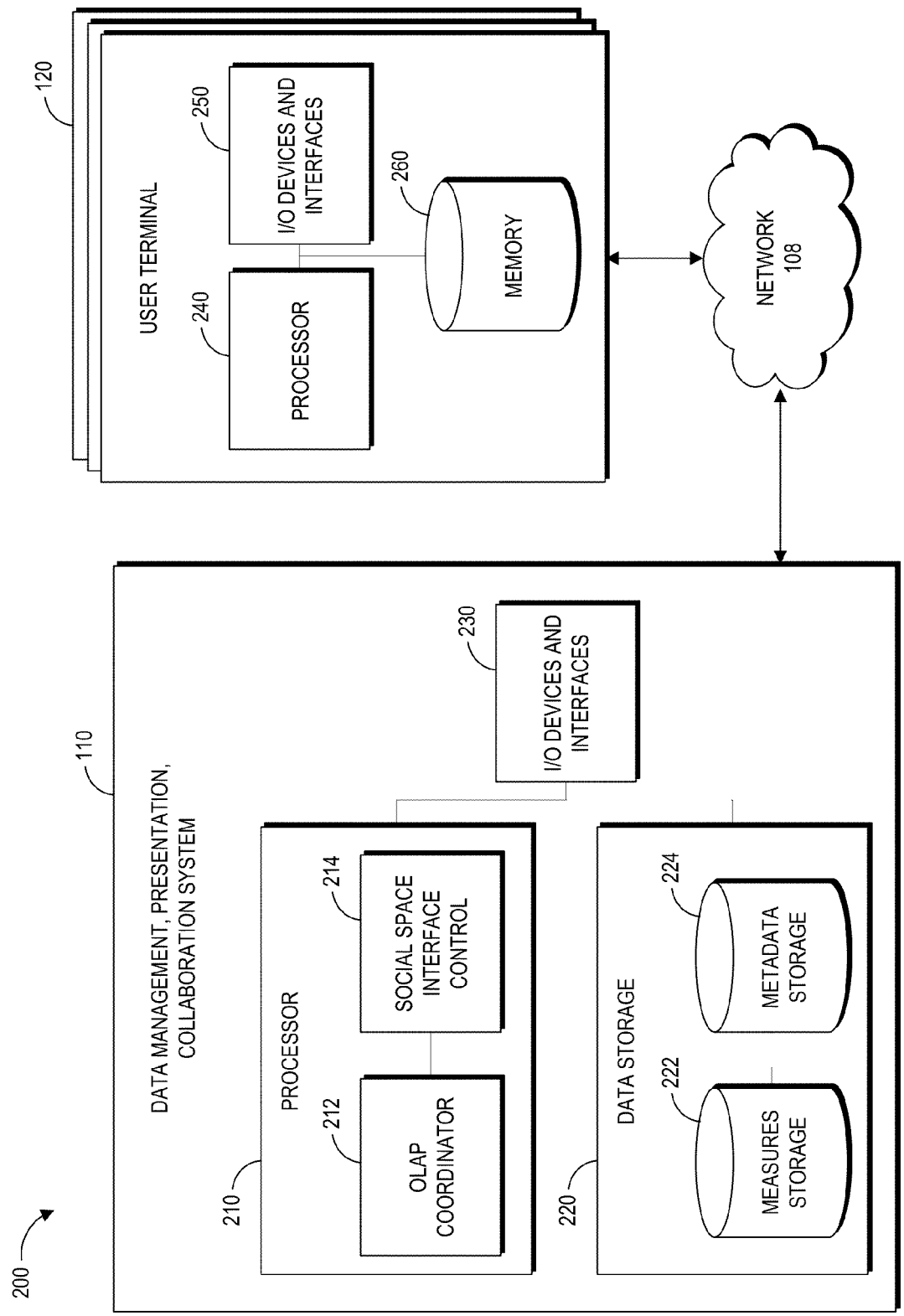
FIG. 2 depicts an embodiment of components of the computing environment of FIG. 1.

FIG. 2 depicts an embodiment 200 of components of the computing environment 100 of FIG. 1, including the system 110 and the user terminals 120. As illustrated in FIG. 2, the system 110 can include a processor 210, data storage 220, and input/output (I/O) devices and interfaces 230. The user terminals 120 can each include a processor 240, I/O devices and interfaces 250, and memory 260.

The data storage 220 can include measures storage 222 and metadata storage 224. The data stored in the measures storage 222 and the metadata storage 224 can at least in part be mapped to one or more OLAP cube or multi-dimensional cube structures (for example, having at least three dimensions). The OLAP cube can include numeric values or facts (for example, values indicative of performance of an organization that can vary over time based in part on measured values), which can be referred to as data measures. The data measures, in turn, can be categorized by data dimensions and understood as located at the intersections of the OLAP cube, which is spanned by the data dimensions. Each measure can be considered as having a set of data dimension coordinates or labels (sometimes referred to as metadata) associated with the data measure that can uniquely identify the data measure. In some embodiments, the measures storage 222 can include one or more relational databases configured to store data measures for the organization and data dimensions corresponding to the data measures, and the metadata storage 224 can include one or more relational databases configured to store the contextual objects associated with the data measures. Moreover, although the measures storage 222 and metadata storage 224 are illustrated as separate storages in FIG. 2, the measures storage 222 and metadata storage 224 can be combined into a single storage in some implementations.

The processor 210 can include an online analytical processing (OLAP) coordinator 212. The OLAP coordinator 212 can utilize data dimension coordinates associated with a particular data measure to lookup in the metadata storage 224 whether a contextual object may be associated with the particular data measure. In addition, the OLAP coordinator 212 can provide the results of the lookup to the user terminals 120 so that indications of contextual objects may be displayed alongside data measures by the user terminals 120.

The processor 210 can include a social space interface control 214. The social space interface control 214 can provide instructions and programming code for the user terminals 120 to enable the user terminals 120 to the display the user interfaces for interacting with the system 110. In some embodiments, the user interfaces can be constructed and operated using a web browser of the user terminals 120, for instance, via JavaScript, HTML, and XML programming code. At least a portion of this programming code can be provided by the social space interface control 214. However, in other embodiments, a dedicated application run by the operating system of the user terminals 120 can instead communicate with the social space interface control 214 to provide the user interfaces of the user terminals 120. The communication between the system 110 and the user terminals 120 can be performed through the I/O devices and interfaces 230 and I/O devices and interfaces 250, which can be configured to communicate over the network 108.

The processor 240 and memory 260 of the user terminals 120 can present one or more user interfaces on a display device, such as a monitor, of the I/O devices and interfaces 250. The user interfaces can facilitate the display of data provided by the system 110 to users of the user terminals 120 and allow users to access data through the use of stylized screen elements such as, for example, menus, windows, dialog boxes, toolbars, and controls (for example, radio buttons, check boxes, sliding scales, or the like). Additionally, the I/O devices and interfaces 250 can include input or output devices such as a keyboard, mouse, touchpad, or touchscreen through which users can provide indications or commands to the user terminals 120.

Figure 3:
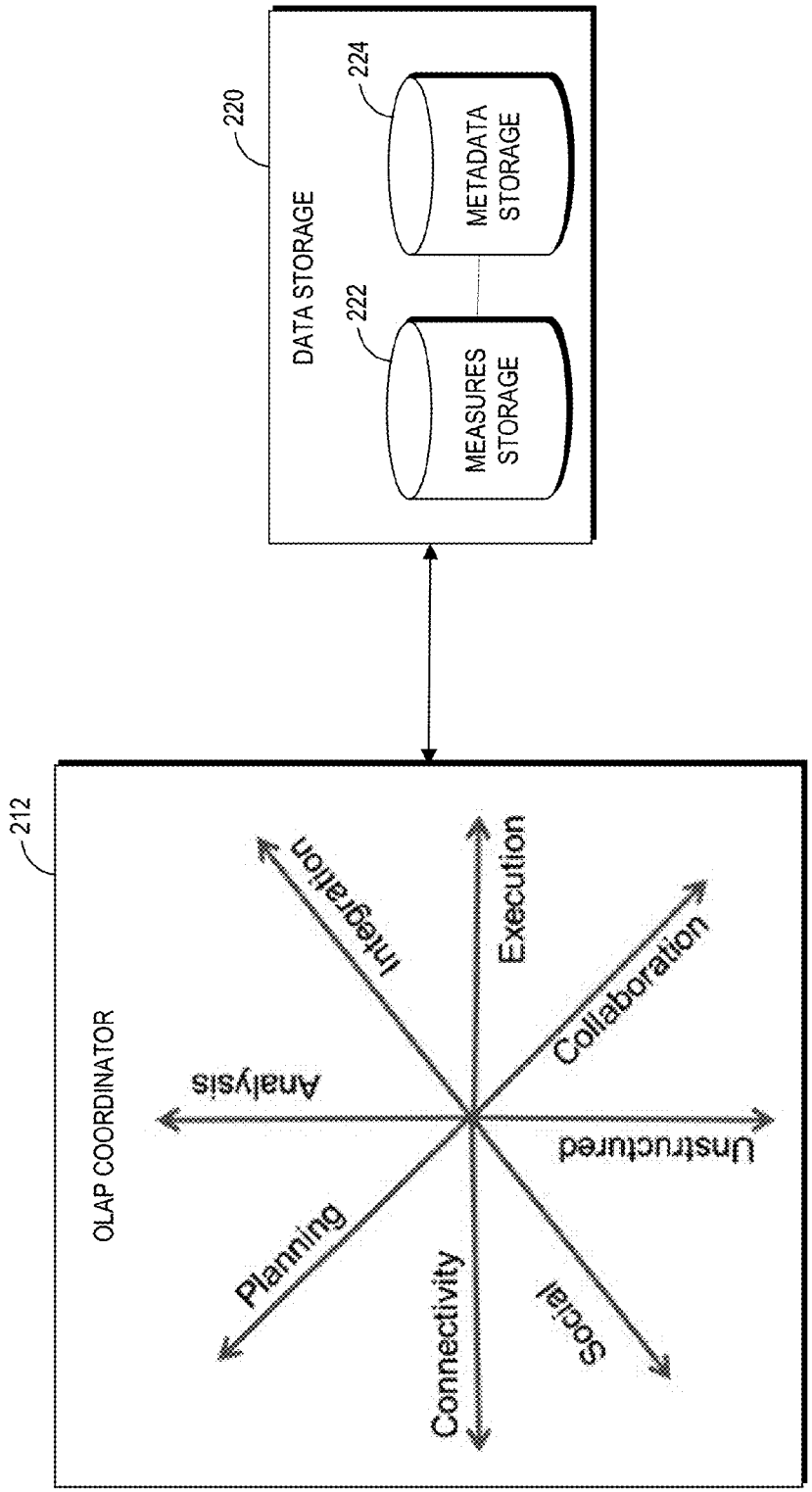
FIG. 3 depicts an embodiment of an OLAP coordinator useable to receive data from one or more data storages.

FIG. 3 depicts an embodiment of an OLAP coordinator useable to receive data from one or more data storages. As illustrated by the star structure within the OLAP coordinator 212, the OLAP coordinator 212 can be configured to receive and utilize data of numerous disparate types. Each arrow or vector of the star structure can represent a hyperspace or a different type of data that may be handled by the OLAP coordinator 212. The OLAP coordinator 212, for instance, can handle analysis data (for example, analytical, presentation, or data navigation features), integration data (for example, workflow enhancement or new application developing methods), execution data (for example, application development), collaboration data (for example, discussions, tasks, activity flows, or signals), unstructured data (for example, semantic searches or document editors), social data (for example, social environment or social spaces), connectivity data (for example, client or supplier communications), and planning data (for example, processes or workflows).

Figure 4:
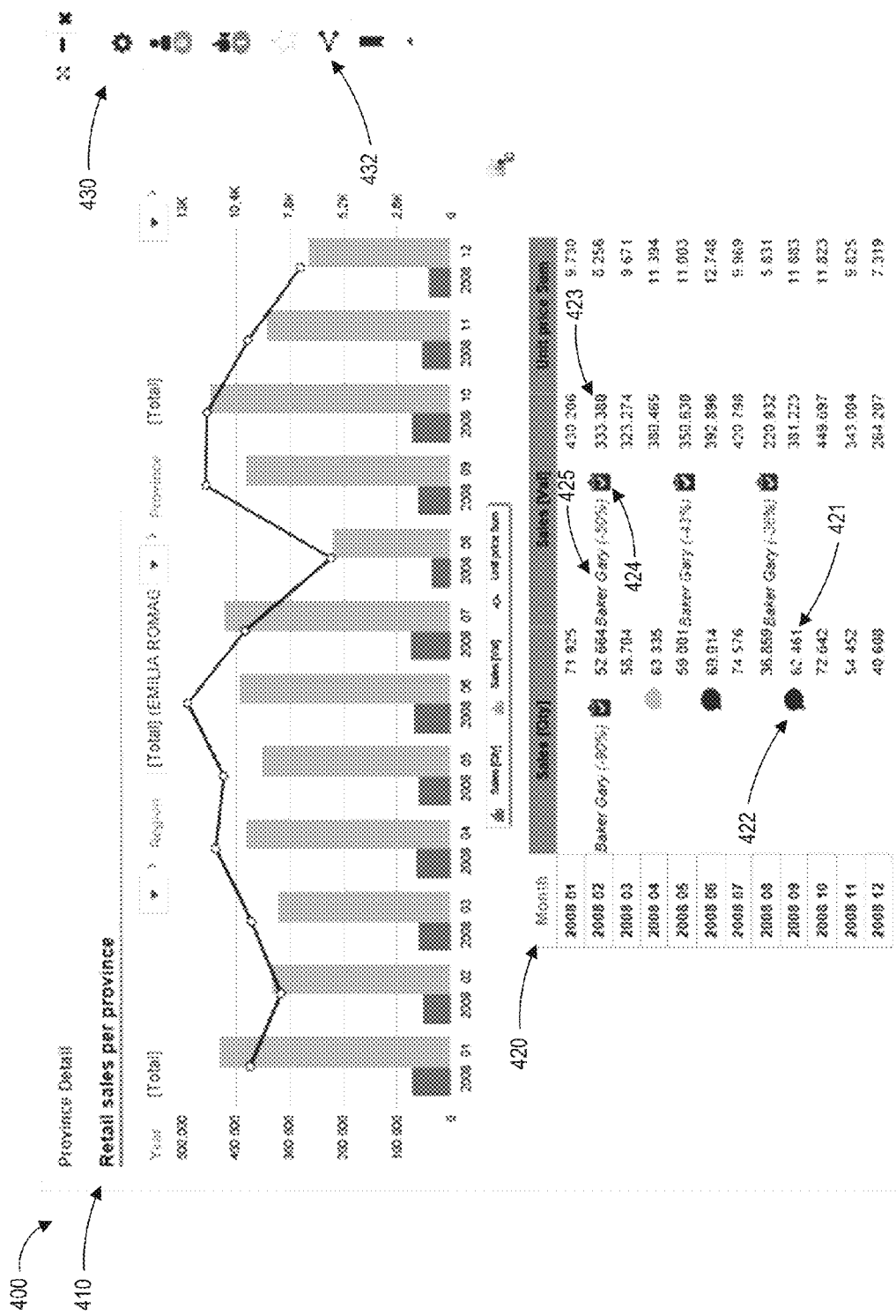
FIG. 4 depicts an example user interface for facilitating data measure driven collaboration between users or entities.

FIG. 4 depicts an example user interface 400 that facilitates collaboration between users based on data measures. The user interface 400 can, for example, be presented on one or more displays of the I/O devices and interfaces 250 of the user terminals 120. The user interface 400 can show multiple data measures to the users of the user terminals 120, along with any contextual objects associated with the presented data measures. The information displayed can be provided to the user terminals 120 by the system 110. In the example of FIG. 4, information about the retail sales per province is displayed in the user interface 400.

The user interface 400 includes a chart 410, a report 420, and user navigation and task buttons 430. The chart 410 can display multiple data measures in a visually appealing form, such as a graph, for review by the users. As is illustrated in FIG. 4, the chart 410 can display data in the form of bars in a bar graph or connected points in a line graph. The report 420 can display the multiple data measures through a pivot table in a grid or spreadsheet for review by the users. The x-axis and y-axis of the report 420 can display the different dimensions corresponding to the data measures, providing descriptions for the data measures displayed in the report 420. The user navigation and task buttons 430 can provide various navigation or operation functionalities when selected by the users. One button of the user navigation and task buttons 430 includes the signal button 432 that, when selected, can enable a user to assign a signal object to a chart or report.

Among the data measures displayed in the report 420 is the data measure 421. The data measure 421, in particular, shows the quantity of retail sales for the month of September in the year 2008 for an organization. The value of the data measure 421 is 62,461 sales at this time. In association with the data measure 421 is displayed an indication 422 of a discussion contextual object (for example, the data measure 421 is alongside or near the associated data measure such that users can understand that the indication 422 is associated with the data measure 421). When the indication 422 may be selected (for example, based on a user clicking/pressing the indication 422 or placing a pointer over the indication 422), the contents of the discussion contextual object corresponding to the indication 422 can be displayed, such as by displaying the example user interface 800 described in more detail with respect to FIG. 8. The contents of the discussion contextual object can include information such as a discussion between multiple users and/or links to one or more other objects (for example, discussion contextual objects, document contextual objects, or the like) related to the data measure. In some embodiments, the indication 422 can change in appearance, such as in color or shape, to indicate that the contextual object corresponding to the indication 422 has changed since contents of the contextual object were last displayed.

In addition, the data measures of the report 420 include the data measure 423. The data measure 423 shows the value of retail sales for the month of February in the year 2008 for the organization. The value of the data measure 423 is 333,380 value at this time. In association with the data measure 423 is displayed an indication 424 of a task contextual object (for example, the data measure 423 is alongside or near the associated data measure such that users can understand that the indication 424 is associated with the data measure 423). When the indication 424 may be selected by user (for example, based on a user clicking/pressing the indication 422 or placing a pointer over the indication 422), the contents of the task contextual object corresponding to the indication 424 can be displayed. The contents of the task contextual object can include information such as a user assigned the task and a target value for the data measure associated with the task. As illustrated in FIG. 4, an indication 425 of the user assigned the task (Baker Gary in this example) and a value indicative of the target value (−50% in this example) can be displayed in association with the data measure 423. The value indicative of the target value can, for instance, show a percentage difference between the value of the data measure at this time and the target value of the data measure. Other attributes or contents of a task contextual object, which can optionally be displayer or set by a user, may include a due date, priority, severity, attached documents, additional recipients, visibility policy for users that may view the task, task progress, or notifications for the task.

Although the example of FIG. 4 and other examples in this disclosure may describe associating one contextual object with a single data measure, one contextual object can additionally or alternatively be associated with multiple data measures in some embodiments. In such cases, an indication of the contextual object associated with the multiple data measures can be displayed near one or more of the data measures (for example, near only a single associated data measure or near all of the associated data measures), depending on the implementation. Moreover, in some embodiments, additionally or alternatively, multiple contextual objects can be associated with a single data measure. The multiple contextual objects can be the same type of contextual objects or different types of contextual objects.

Figure 5A:
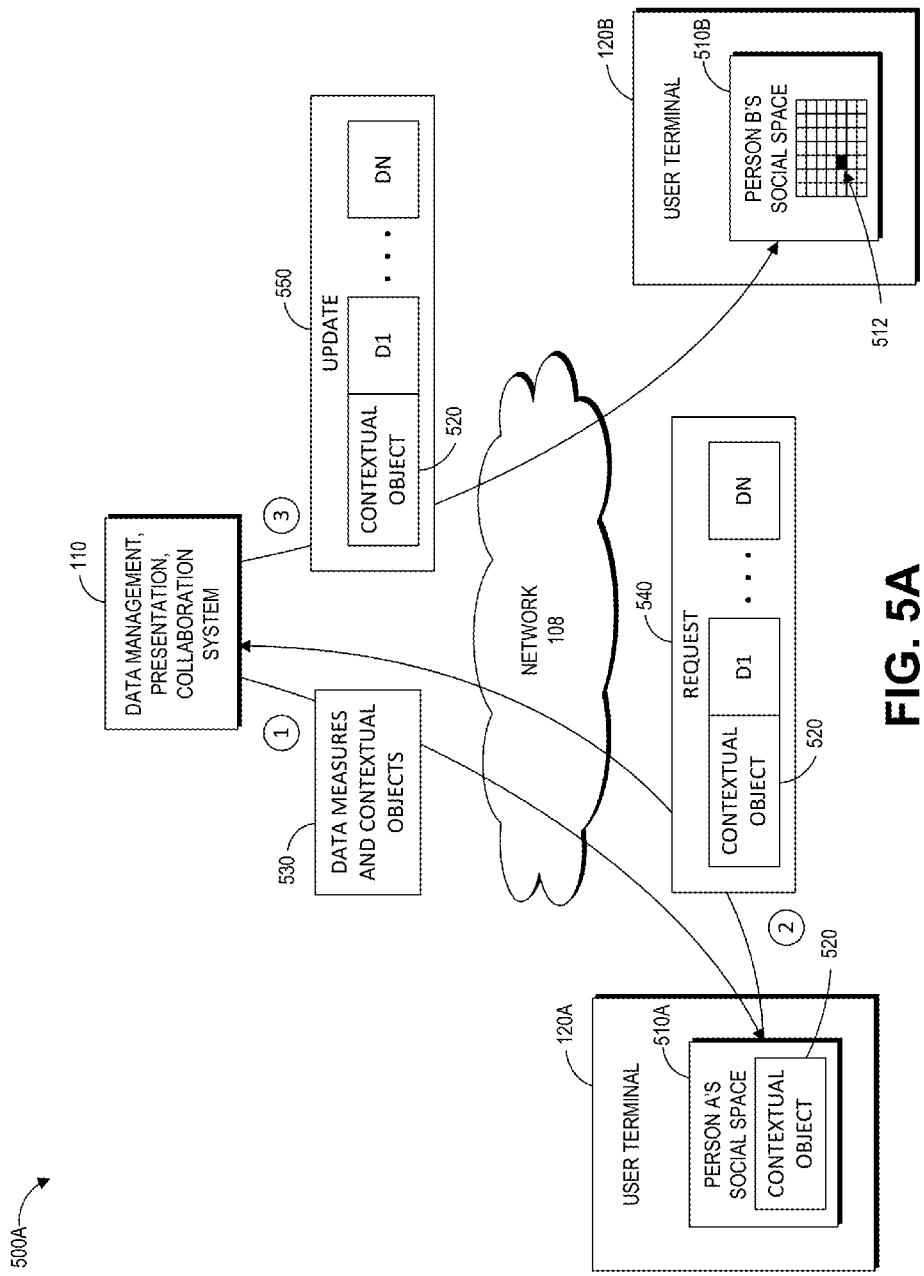
FIGS. 5A and 5B depict example communications in computing environments having two or more user terminals configured to communicate through an intermediary system.

FIG. 5A depicts example communication in a computing environment 500A having two user terminals configured to communicate through an intermediary system. The computing environment 500A, as illustrated, includes components of the computing environment 100, including the system 110 and the user terminals 120. The user terminals 120A and 120B can each display an individual user's social space, such as the social spaces 510A or 510B, usable to present data from the system 110 and communicate data to the system 110. State transitions, which indicate communications between the system 110 and the user terminals 120, are represented by circled numbers in the diagram.

At state transition 1, the system 110 can transmit data measures and contextual objects (for example, discussion or task contextual objects) to the user terminal 120A. The system 110 may have transmitted the data measures and/or contextual objects in response to a request for the data measures or contextual objects from the user terminal 120A. In some cases, the system 110 may transmit indications of contextual objects rather than the contextual objects.

A user of the user terminal 120A may decide to associate a new contextual object, such as the contextual object 520, with a data measure. The user, in this case, can specify to the user terminal 120A to select a data measure displayed in the social space 510A and assign a new contextual object to the data measure. In addition, the user of the user terminal 120A may decide to view and/or edit the contents of a pre-existing contextual object associated with a data measure. To do so, the user can specify to the user terminal 120A to select an indication of the contextual object displayed in the social space 510A and display the contextual object, such as the contextual object 520. Once the contents of the contextual object are displayed, the user can review and/or revise the contents of the contextual object.

Each time the user terminal 120A may associate a contextual object, such as the contextual object 520, with the data measure or later edits the contents of a contextual object, such as the contextual object 520, the user terminal 120A can transmit a request 540 via the network 108 to the system 110 at state transition 2. The request 540 can indicate to accordingly associate the contextual object 520 with a selected data measure or modify the contextual object 520 associated with the selected data measure. The request 540 can include the entire contents of the contextual object 520, as illustrated, or instead indications of a modified portion of the contextual object 520. Further, the request 540 can include the data dimension coordinates (for example, dimension coordinates D1, . . . , DN) of the data measure associated with the contextual object 520 so that the system 110 can correctly associate the new contextual object or modifications to the contextual object with the correct data measure.

Upon receipt of the request 540, the system 110 can appropriately add or revise the contextual object 520 associated with the provided data dimension coordinates based on the contents of the request 540. The contextual object 520 can then be stored in the metadata storage 224 for later retrieval. In some embodiments, the system 110 can first determine whether the user terminal 120A or the user of the user terminal 120A may be permitted to access the data measure identified by the provided data dimensions. The system 110, in such embodiments, can associate the contextual object 520 with the data measure or modify the contextual object 520 if the user terminal 120A or the user of the user terminal 120A may be permitted to access the data measure. On the other hand, the system 110 may not associate or modify the contextual object 520 if the user terminal 120A or the user of the user terminal 120A may not be permitted to access the data measure.

At state transition 3, the system 110 can transmit an update 550 via the network 108 to the user terminal 120B. The update 550 can include the entire contents of the contextual object 520, as illustrated, or instead indications of a modified portion of the contextual object 520. Further, the update 550 can include the data dimension coordinates (for example, dimension coordinates D1, . . . , DN) of the data measure associated with the contextual object 520 so that the user terminal 120B can associate the new contextual object or modifications to the contextual object with the correct data measure. In some cases, the system 110 may transmit an indication 512 of contextual object 520 rather than contextual objects for display in the social space 510B. When the user terminal 120B may receive the update 550, the user terminal 120B can update the social space 510B with the contextual object 520. For instance, the user terminal 120B can update a report displayed in the social space 510B, which shows the data measure corresponding to the contextual object 520, with the indication 512 of the contextual object. Moreover, in the case of a task contextual object, if the task contextual object is assigned to a user of the user terminal 120B, receipt of the task contextual object can further result in the task included in the task contextual object being automatically added to a task list for the user viewable in the social space 510B.

The system 110 can transmit the update 550, for example, in response to one or more requests for data measures and/or contextual objects, such as a request for the data measure associated with the contextual object 520, from the user terminal 120B. In some cases, the request that triggers the transmission of the update 550 can be received by the system 110 before the system 110 may receive the request 540 from the user terminal 120A. Accordingly, the system 110 may be aware that the user terminal 120B may be displaying or prepared to display the data measure associated with the contextual object 520, and the system 110 can thus transmit the update 550 so that the user terminal 120B may be updated in substantially real-time (for example, without perceivable delay to a user) regarding the contextual object 520.

Figure 5B:
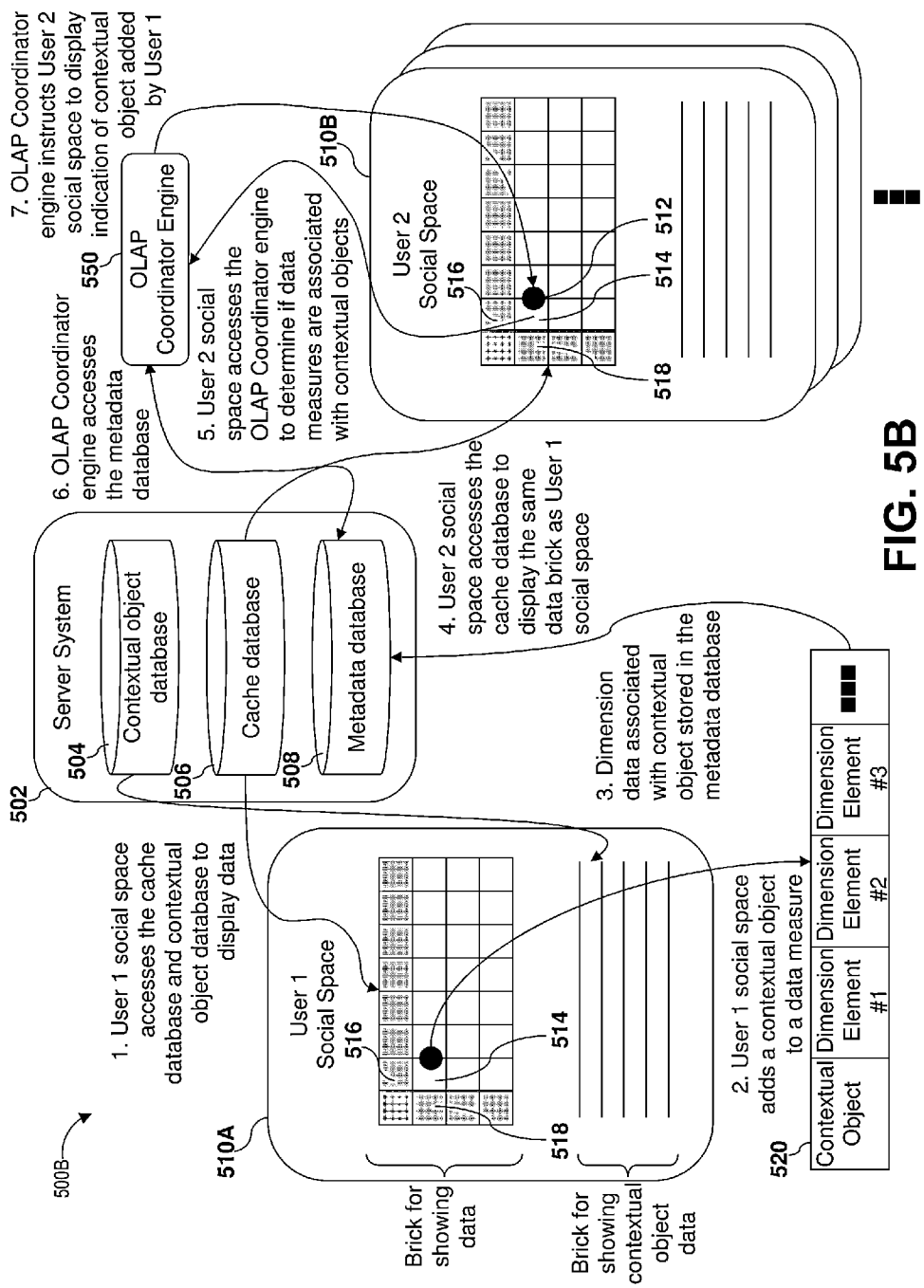

FIG. 5B depicts example communication in a computing environment 500B having two or more user terminals configured to communicate through an intermediary system. The computing environment 500B can be similar to the computing environment 500A of FIG. 5A; however, the computing environment 500B can illustrate a more detailed example of associating a new contextual object with a data measure. State transitions, which indicate actions by the system 502 and OLAP coordinator engine 550 (for example, together corresponding to the system 110) and the User 1 and 2 social spaces 510A and 510B (for example, corresponding to the social spaces 510A and 510B), are represented by numbers in the diagram.

At state transition 1, the server system 502 can provide the User 1 social space with data measures, corresponding metadata, and associated contextual objects from the contextual object database 504 and cache database 506. The information displayed in the User 1 social space can be presented in the form of two bricks; one brick for displaying data measures and one brick for displaying contextual object data, such as contextual object contents. The brick for displaying the data measures can include multiple data dimensions such as the dimensions 516 and 518. A present value of the data measure 514 can be displayed in a data cell at the intersection of the data dimension coordinates 516 and 518.

At state transition 2, User 1 social space 510A can add a new contextual object 520 (for example, a discussion or task contextual object) to the data measure 514 by transmitting a request to associate to the server system 502. The request can include the contextual object 520 that the user would like to associate with the data measure, as well as the data dimension coordinates identifying the data measure associated with the contextual object 520. At state transition 3, the server system 502 can store the received contextual object and data dimension coordinates in the metadata database 508 and/or the contextual object database 504. At state transition 4, the User 2 social space 510B can access the cache database 506 to display the same data brick as the User 1 social space. For example, User 2 social space 510B can transmit a request to access the same data brick as displayed in the User 1 social space 510A.

At state transition 5, the User 2 social space 510B can access the OLAP coordinator engine 550 to determine if any displayed data measures are associated with contextual objects. In one example, the User 2 social space 510B can transmit a request for one or more contextual objects to the OLAP coordinator engine 550. At state transition 6, the OLAP coordinator engine 550 can access the metadata database 508 using the data dimension coordinates corresponding to the displayed data measures to retrieve any associated contextual objects. In this example, OLAP coordinator engine 550 can determine that the added contextual object 520 can be associated with the displayed data measure. At state transition 7, the OLAP coordinator engine 550 can instruct User 2 social space 510B to display an indication 512 of the contextual object 520 in association with or nearby (for example, within a maximum distance of) the displayed value of the data measure.

Figure 6:
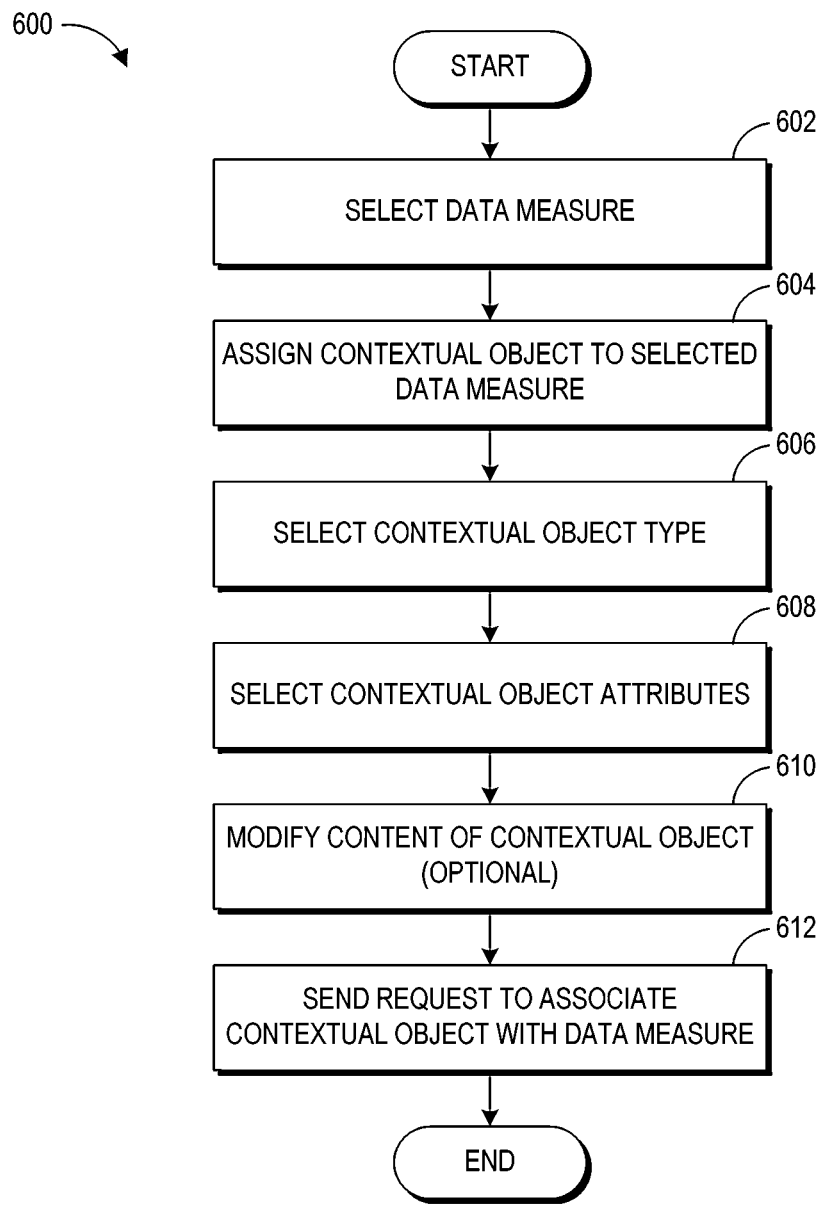
FIG. 6 depicts an embodiment of a contextual object creation process.

FIG. 6 depicts an embodiment of a user terminal contextual object creation process 600. For convenience, the process 600 is described as being implemented by the components of the computing environments 200 and 500A described above with respect to FIGS. 2 and 5A. However, the process 600 is not limited as such and may be implemented by any other system described herein or components thereof, or other computing devices or systems comprising physical computer hardware and/or software.

At block 602 of the process 600, a data measure can be selected. For example, a user of the user terminal 120A can indicate to select a data measure displayed by the user terminal 120A on a user interface, such as the user interface 400, causing the user terminal 120A to select the data measure. The user may indicate the selection using the I/O devices and interfaces 250. At block 604, a contextual object can be assigned to the selected data measure. The contextual object can be assigned based on an indication by user to associate the contextual object with the selected data measure. The user can, for instance, indicate to assign the contextual object by selecting the contextual object option from a menu of options. At block 606, a type of contextual object can be selected. The type of contextual object can be selected, for example, by a user indicating to select a particular contextual object type from a list of available contextual object types. The type of contextual objects can include a discussion or task contextual objects, in some embodiments.

At block 608, the attributes for the contextual object can be selected. For example, the user terminal 120A can display the configurable attributes corresponding to the selected type of contextual object. The user, in turn, can input or choose from the available attributes to set up the contextual object. In the case of a task contextual object, the attributes of a user to be assigned the task and a target data measure value can be input. At optional block 610, the contents of the assigned contextual object can be modified. The user terminal 120A can, for instance, access and display the contextual object, and the user may then indicate to modify the contents of the contextual object by, for example, providing a first discussion entry for a discussion contextual object or task instructions for a task contextual object.

At block 612, a request can be sent to associate the contextual object with the selected data measure. The user terminal 120A can, for instance, send a request via the network 108 to the system 110 that the contextual object be associated with the selected data measure. Once the contextual object is successfully associated with the data measure, the user terminals 120A and 120B can display the contextual object in association with the data measure when the selected data measure may be displayed by the user terminals 120A and 120B in the future.

Figure 7:
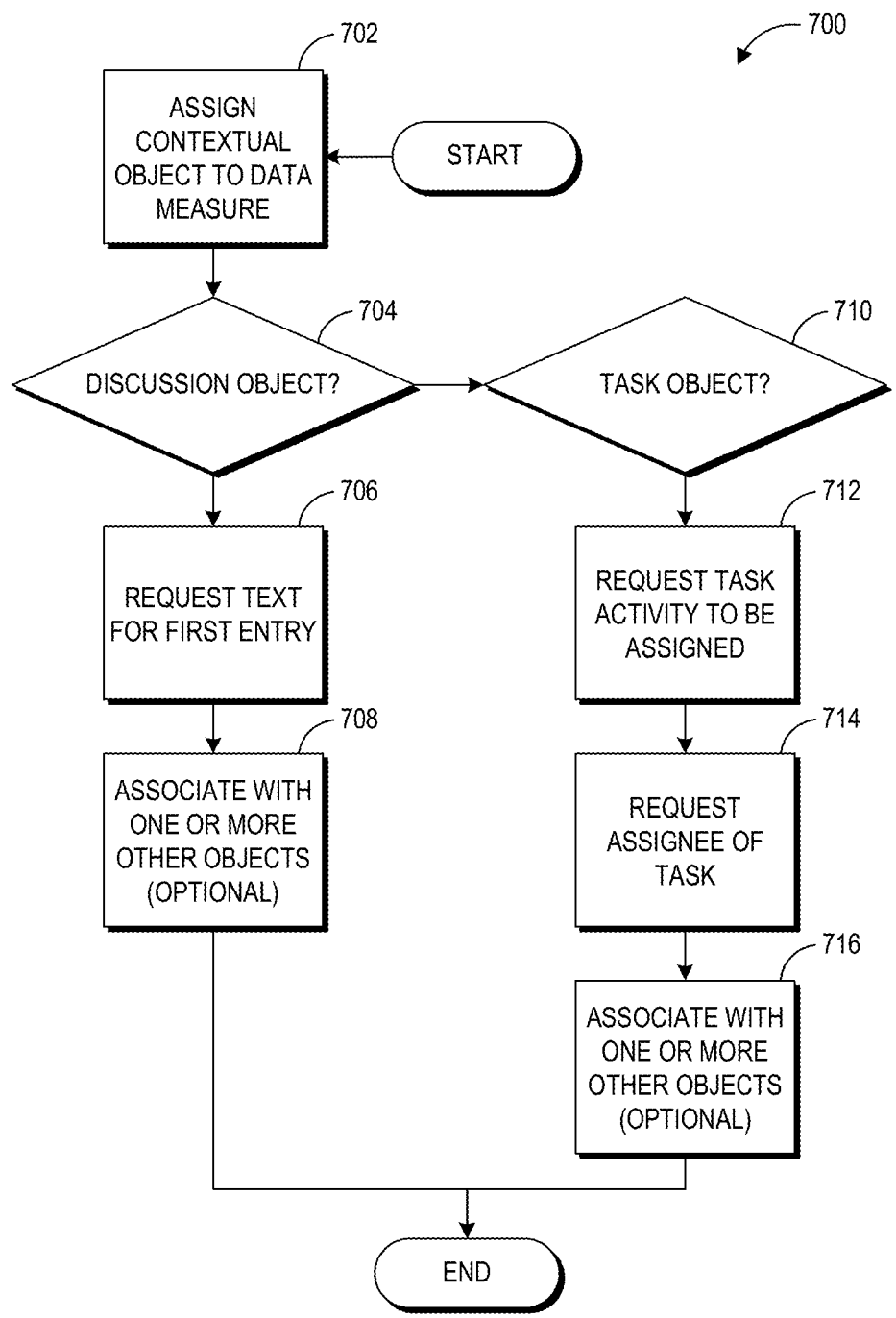
FIG. 7 depicts an embodiment of a contextual object selection process.

FIG. 7 depicts an embodiment of a user terminal contextual object selection process 700. For convenience, the process 700 is described as being implemented by the components of the computing environments 200 and 500A described above with respect to FIGS. 2 and 5A. However, the process 700 is not limited as such and may be implemented by any other system described herein or components thereof, or other computing devices or systems comprising physical computer hardware and/or software. In some embodiments, the process 700 can be performed by a user terminal operated by any user. However, in other embodiments, performance of one or more blocks of the process 700 can be limited to a group of assigned administrator users.

At block 702 of the process 700, a contextual object can be assigned to a data measure. For example, a user of the user terminal 120A can indicate to assign a particular type of contextual object to a data measure displayed by the user terminal 120A on a user interface, such as the user interface 400. The user may indicate the selection using the I/O devices and interfaces 250. Upon assignment of the contextual object to the data measure, a series of queries can be performed at blocks 704, 710, 716, and 722 to configure the contextual object before a request is sent to associate the contextual object with the data measure.

At block 704, the process 700 can determine whether the contextual object is a discussion contextual object. The user terminal 120A can, for instance, examine an identifier associated with the contextual object or the selections by the user to assign the contextual object to determine whether the contextual object is a discussion contextual object. If the contextual object is a discussion contextual object, at block 706, a first text entry for the discussion contextual object can be requested. In one example, the user terminal 120A display the empty contents of a new discussion contextual object and enable the user to input text. The user can then input text, for instance, that highlights a past change in the value of the data measure, suggests review of the value, or indicates an expected future shift in the value. The input text can initiate a discussion based on the data measure with other users and begin a workspace where other users can respond to the input text with additional text entries.

At optional block 708, a discussion of the discussion contextual object can be associated with one or more other objects, such as task contextual objects, document contextual objects, reports, mashboards, blog contextual objects, user identifier contextual object, user social space contextual objects, signal contextual objects, or the like. In some embodiments, the discussion contextual object can, for example, provide the functionality for a user to link (for instance, hyperlink) a discussion of the discussion contextual object to other objects. These associations can further provide relevant information or context for reviewers of the discussion contextual object and the data measure. In some embodiments, the signal contextual objects can enable users or social spaces to be notified regarding a data measure, for instance, such as a change in the data measure. The signal contextual objects additionally may enable users to provide one or more conditions (for example, a timing delay or certain value of the data measure) for notifying, which upon satisfaction of the condition, may result in a message or indication of the signal being provided to a particular user or social space.

If the contextual object is not a discussion contextual object, at block 710, the process 700 can determine whether the contextual object is a task contextual object. The user terminal 120A can, for instance, examine an identifier associated with the contextual object or the selections by the user to assign the contextual object to determine whether the contextual object is a task contextual object. If the contextual object is a task contextual object, at block 712, a task activity to be assigned can be requested. In one example, the user terminal 120A can prompt the user to select or input a task activity. At block 714, an assignee of the task can be requested. For instance, the user terminal 120A can prompt the user to select a user of the user terminals 120 (for example, the user of the user terminal 120B), one or more users of a social space, or a social space to assign the task.

At optional block 716, the task contextual object can be associated with one or more other objects, such as task contextual objects, document contextual objects, reports, mashboards, blog contextual objects, user identifier contextual object, user social space contextual objects, signal contextual objects, or the like. In some embodiments, the task contextual object can, for example, provide the functionality for a user to link (for instance, hyperlink) the task contextual object to other objects. These associations can further provide relevant information or context for reviewers of the task contextual object and the data measure.

Figure 8:
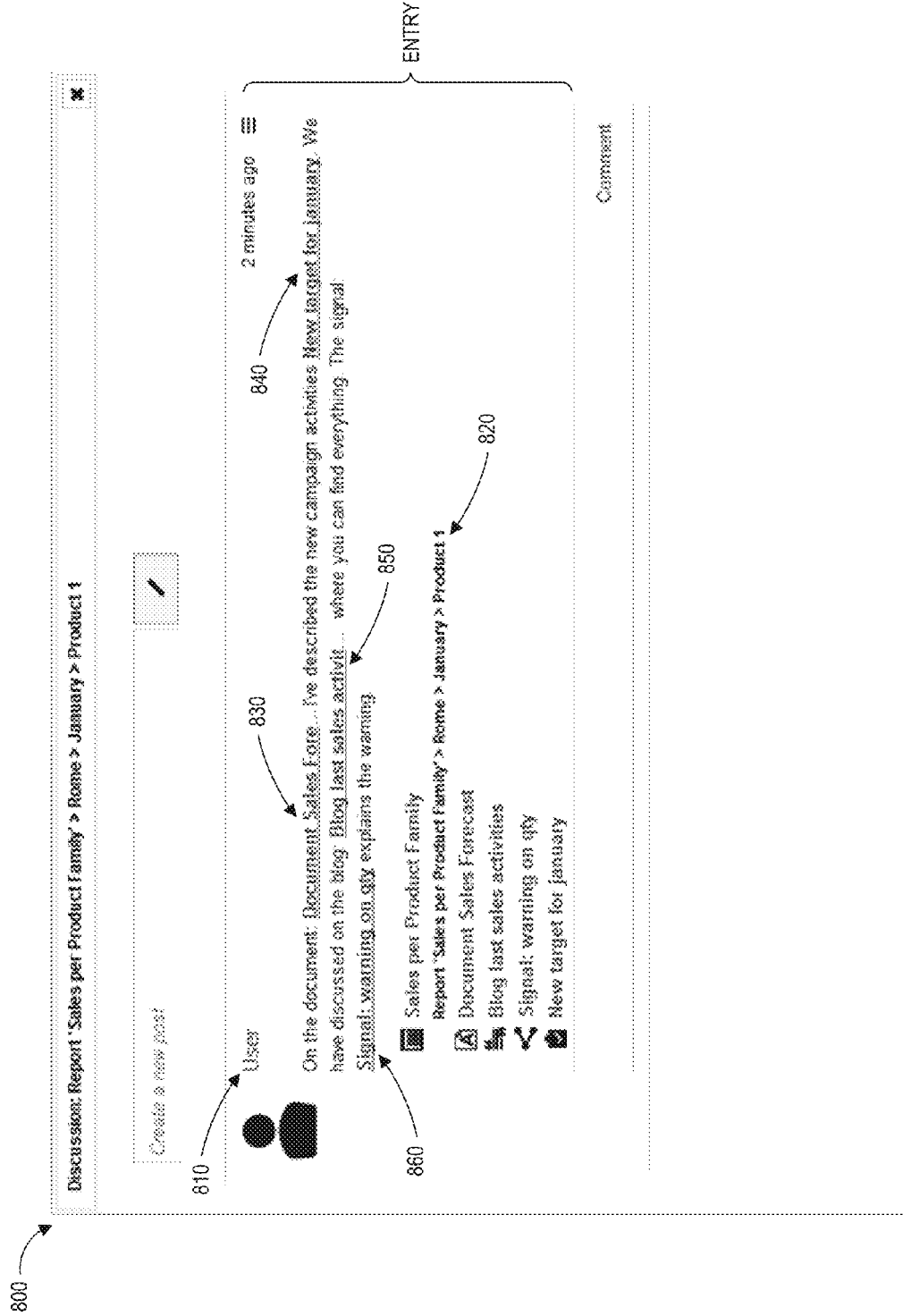
FIG. 8 depicts an example user interface that enables a user to customize the contents of a discussion contextual object.

FIG. 8 depicts an example user interface 800 that enables a user to customize the contents of a discussion contextual object. The user interface 800 can, for example, be presented on one or more displays of the user terminals 120. The user interface 800 can display multiple discussion entries and enable users to create new entries (sometimes referred to as posts or discussions). Each entry can include a username identifier, such as a user identifier 810, which may indicate the user that posted the entry. In the illustrated example, the user identifier 810 provides that User added the ENTRY to the discussion contextual object. The information displayed in the user interface 800 can be input by users via the user terminals 120 and managed by the system 110. Advantageously, in some embodiments, the discussion contextual object can enable the internalization of communication regarding data of an organization. That is, for example, rather than sending an email with an attached spreadsheet or initiating a chat session using a software other than a data management software, users can initiate a discussion associated to a data measure and link one or more relevant objects, such as a report spreadsheet, from within a data management software. As result, users can realize significant time savings and reduction in hassle by using the discussion contextual object.

Each discussion entry of a discussion contextual object can include information provided or linked by a user of a user terminal, such as the user terminal 120A. The text and links of discussion of entries can enable users of the user terminals 120 to engage in discussions through the discussion contextual object and collaborate based on a data measure associated with the discussion contextual object that is identified by the data dimension coordinates 820 (in this example, the data dimension coordinates include 1. Rome, 2. January, and 3. Product 1). The title of the report can provide a context for the dimension labels (in this example, Report 'Sales per Product Family'). The ENTRY, for instance, includes text posted by User that initiated a discussion of the discussion contextual object, which another user, for instance, can now respond to with a new additional entry. The discussion contextual object can provide a workspace for a conversation between users of the user terminals 120, enable users to provide context to a data measure by enabling users to comment on the data measure or a value of the data measure, provide goals regarding the data measure or value of the data measure, indicate a responsibility of a user over the data measure, or facilitate planning by a group of users regarding the data measure.

Along with the posted plain text, the ENTRY provides links to objects that can give additional context to the discussion contextual object and posted plain text. The ENTRY, as illustrated, includes links (in some embodiments, selectable links to navigate to the linked objects) to a document contextual object 830, a task contextual object 840, a blog contextual object 850, and a signal contextual object. The document contextual object 830, task contextual object 840, blog contextual object 850, and signal contextual object 860, in particular, respectively link to a document titled "Document Sales Forecast," a task titled "New target for january," a blog titled "Blog last sales activities," and a signal titled "Signal: warning on qty." Via the text of the ENTRY, User suggests that on the document Document Sales Forecast the User has described new campaign activities for the task New target for january. User further explains that additional details are discussed on the blog Blog last sales activities and that a signal Signal: warning on qty is associated with the data measure. Although not illustrated in the example of FIG. 8, an entry of a discussion contextual object can further link to a user social space contextual object that when selected can display the social space for a particular user. In addition, in some embodiments, an entry of a discussion contextual object can be linked to a sound contextual object or a video contextual object that can store and play audio or video data. Moreover, in some embodiments, the listing of objects at the end of an entry (for example, the "Sales per Product Family," "Document Sales Forecast," "Blog last sales activities," "Signal:warning on qty," and "New target for january" illustrated at the bottom of the ENTRY) can provide a summary of the contextual objects linked to the particular entry of a document contextual object.

Figure 9:
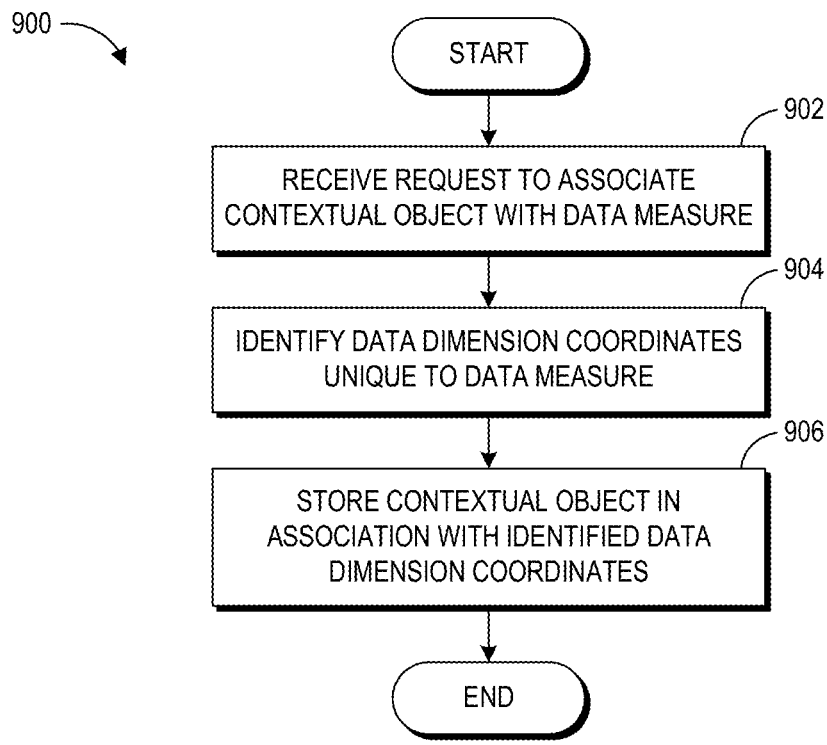
FIG. 9 depicts an embodiment of a system contextual object and data measure association process.

FIG. 9 depicts an embodiment of a system contextual object and data measure association process 900. For convenience, the process 900 is described as being implemented by the components of the computing environments 200 and 500A described above with respect to FIGS. 2 and 5A.

However, the process 900 is not limited as such and may be implemented by any other system described herein or components thereof, or other computing devices or systems comprising physical computer hardware and/or software.

At block 902 of the process 900, a request to associate a contextual object with the data measure can be received. For example, the system 110 can receive a request via the network 108 from the user terminal 120A to associate a provided contextual object with a particular data measure. At block 904, the data dimension coordinates unique to the data measure can be identified. In one example, the system 110 can determine the dimension coordinates based on the dimension coordinates provided in the request. At block 906, the contextual object can be stored in association with the identified data dimension coordinates. For instance, the system 110 can store the contextual object along with the associated data dimension coordinates in the metadata storage 224 so that the contextual object can be retrieved from the metadata storage 224 using the associated data dimension coordinates.

Figure 10:
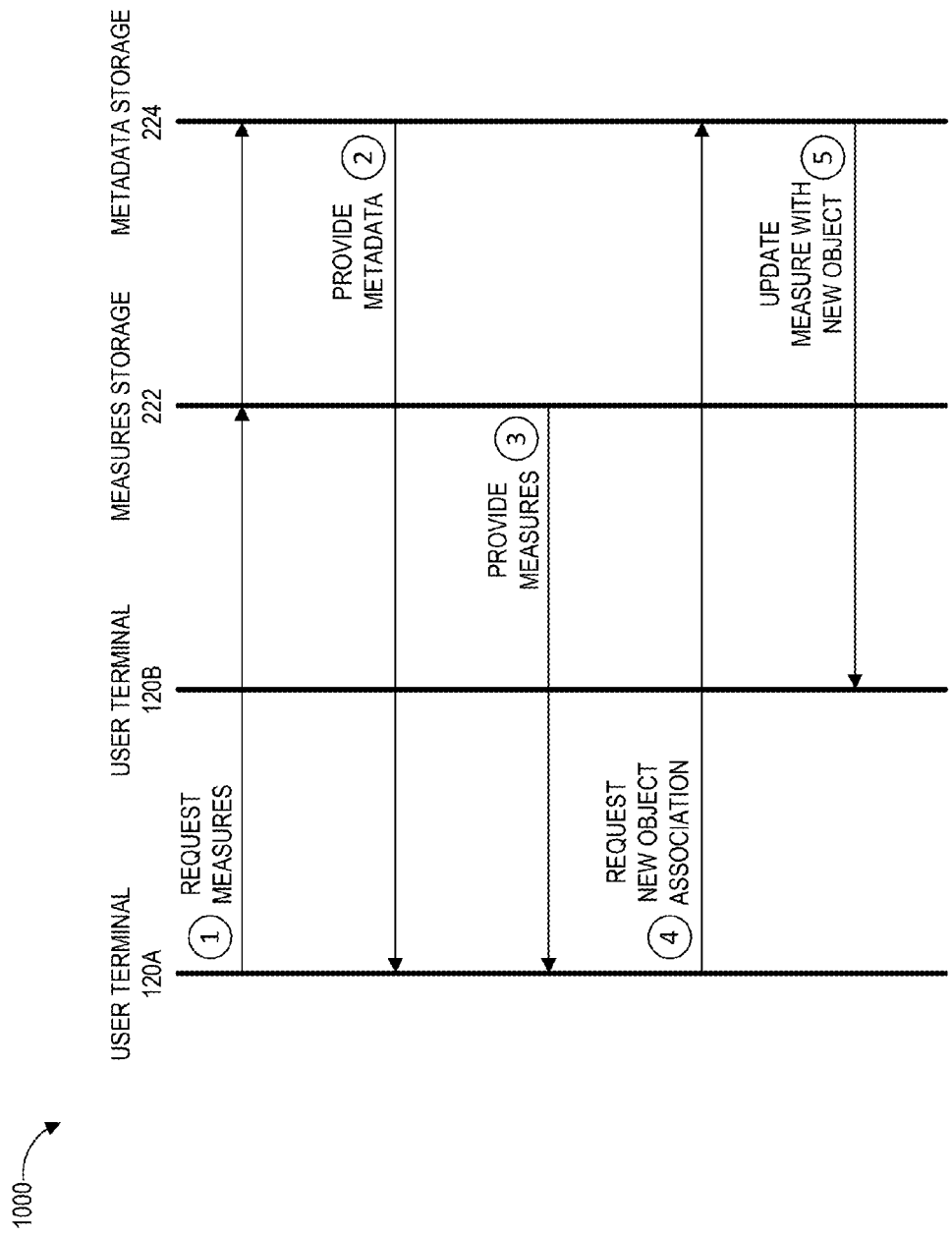
FIG. 10 depicts an example communication timing diagram for communication in a computing environment, such as the computing environment of FIG. 5A.

FIG. 10 depicts an example communication timing diagram 1000 for communication in a computing environment, such as the computing environment 500A of FIG. 5A. As described with respect to FIG. 5A, the user terminal 120A can first request data measures from the system 110. The system 110 can, in response, second provide metadata related to the requested measures accessed from the metadata storage 224, as well as third the requested measures accessed from the measures storage 222. The user terminal 120A can fourth request that a new contextual object, such as a document or task contextual object, be associated with a particular data measure. The system 110 can receive the request and accordingly update the metadata storage 224. Fifth, the system 110 can update the user terminal 120B based on the added contextual object so that a user of the user terminal 120B may be aware of the added contextual object in substantially real-time.

Figure 11:
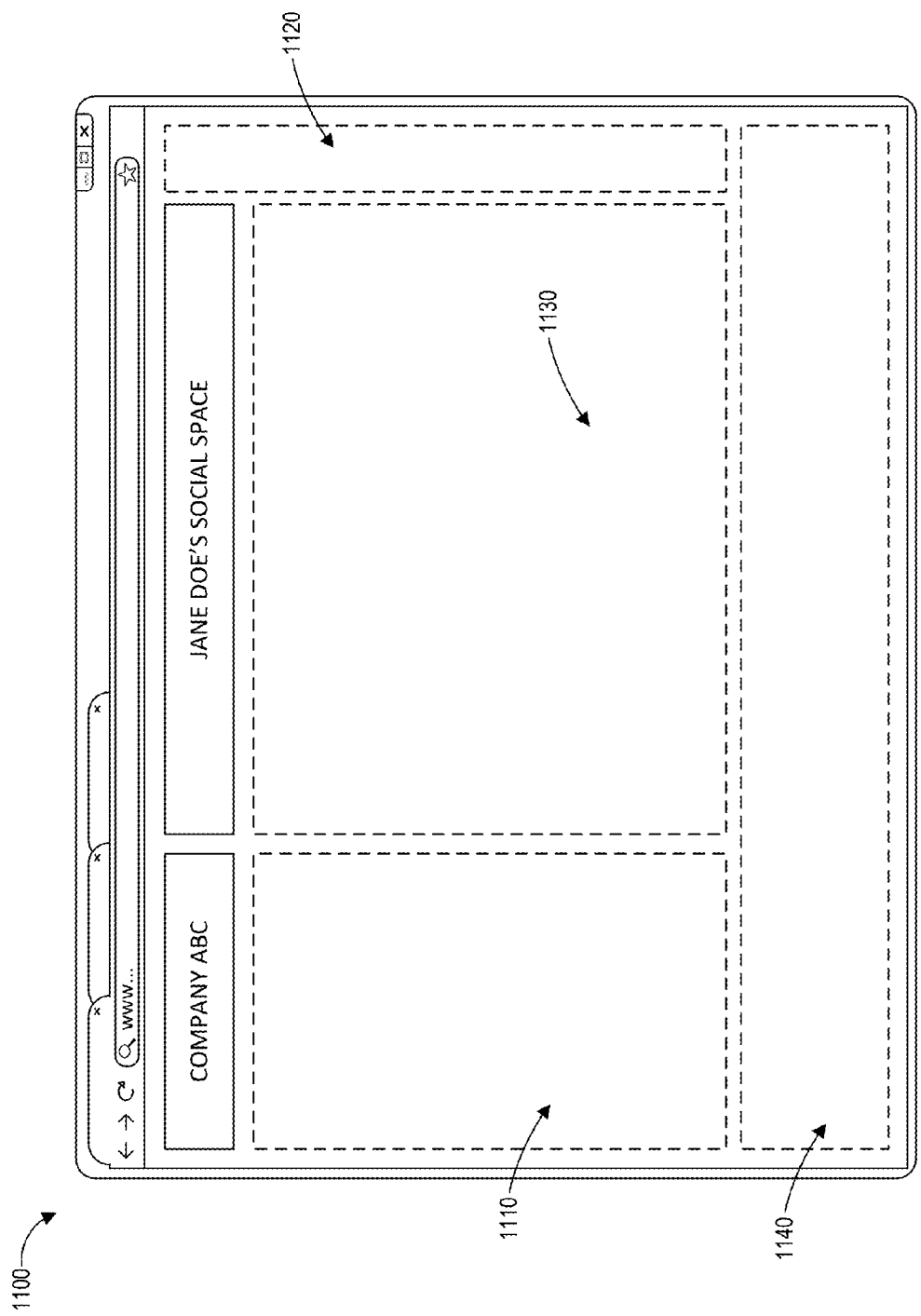
FIG. 11 depicts an example user interface for displaying a customized social space of a user.

FIG. 11 depicts an example user interface 1100 for displaying a customized social space of a user of a user terminal. The user interface 1100 can, for example, be presented on one or more displays of the user terminals 120. The layout of the user interface 1100 can be customized by users to control the order and form in which information may be displayed by the user terminals 120. The information displayed via the user interface 1100 can be provided and managed by the system 110.

As illustrated in FIG. 11, the user interface 1100 can be divided into multiple zones 1110, 1120, 1130, and 1140 where different information can be provided and accessed by the users. The user interface 1100 is labeled as Jane Doe's social space and configured for accessing and collaborating around at least some data related to a Company ABC. Upon creation of Jane Doe's social space, Jane Doe may have selected the data relevant or important to her to facilitate creation of the social space. In some implementations, Jane Doe may have personally chosen the reports, activity feeds, or blogs that she would like to view in the available zones of her social space.

In one example, the multiple zones 1110, 1120, 1130, and 1140 may have been filled in the following way in Jane Doe's social space. The zone 1110 can be used to provide information from blogs that Jane Doe has recently visited. For instance, the zone 1110 can display text or images from one or more blog posts. The zone 1120 can be used to display recent signals that Jane Doe may have received. The signals can, in some embodiments, be displayed in the form of flags selectable by Jane Doe that, when selected, can provide additional details about the signals. The zone 1130 can be used to display a recent activity list or important activities for Jane Doe. For example, the zone 1130 can display a list of recent reports that Jane Doe has viewed or tasks assigned to Jane Doe that have upcoming action deadlines. The zone 1140 can be used to display a specific document of importance to Jane Doe.

Although the following example provides an example approach for filling the multiple zones 1110, 1120, 1130, and 1140 of Jane Doe's social space, this example is merely provided to illustrate one approach. In other examples, the contents of one zone can be shifted to another zone, or a particular zone can include a particular feature or displayed information not included in the following example. Moreover, the size, placement, and number of zones can differ, in some embodiments, from the illustrated zones 1110, 1120, 1130, and 1140 of the user interface 1100.

Figure 12:
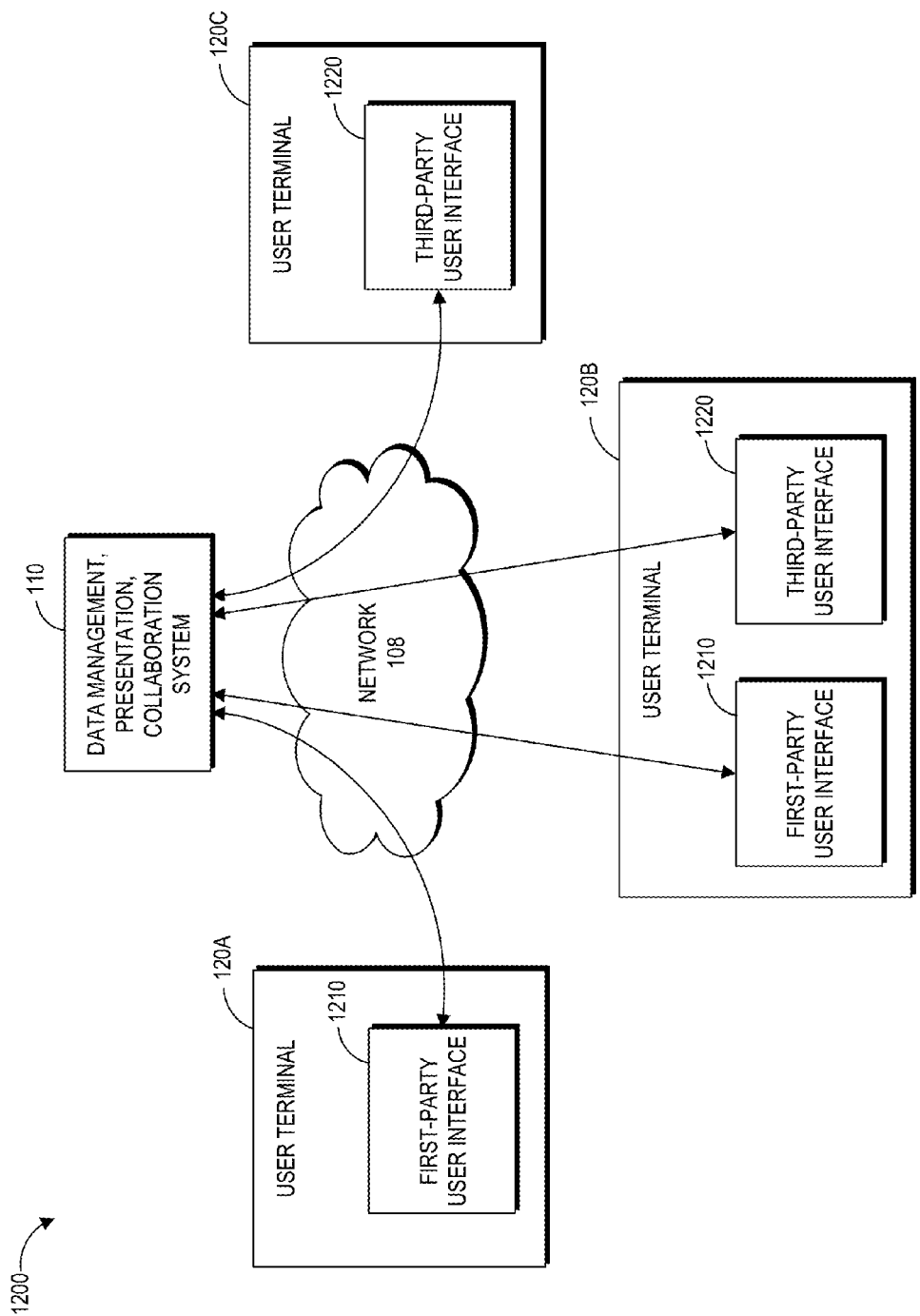
FIG. 12 depicts an embodiment of a computing environment that includes multiple user interfaces for facilitating collaboration.

FIG. 12 depicts an embodiment of a computing environment 1200 that includes multiple user interfaces and for facilitating collaboration. The computing environment 1200, as illustrated, includes components of the computing environment 100 of FIG. 1, including the system 110 and the user terminals 120. The user terminals 120A, 120B, and 120C can each include a first-party user interface 1210 and/or a third-party user interface 1220 for communicating with the system 110 and displaying information from the system 110. The first-party user interface 1210 can be a user interface provided by the system 110 or the developer or programmer of the system 110. On the other hand, the third-party user interface 1220 can be user interface provided by an organization other than the developer or programmer the system 110, but nonetheless usable to interact with the system 110. Advantageously, in certain embodiments, the third-party user interface 1220 can be used to interact with the system 110 rather than the first-party user interface 1210 where a user of the third-party user interface 1220 may be more familiar with or have existing program code usable with the third-party user interface 1220.

In an embodiment, the third-party user interface 1220 can be a spreadsheet application (for example, Microsoft Excel or Apache OpenOffice Calc) usable at least to display data measures managed by the system 110. The spreadsheet application, for instance, can facilitate the display of data in a form similar to the presentation of data in the report 420 of FIG. 4. In some implementations, the third-party user interface 1220 can utilize an add-on, such as an ActiveX add-on, to enable configuration of the spreadsheet application and communication with the system 110. Although in some embodiments the third-party user interface 1220 can include the full array of features available when using the first-party user interface 1210, in other embodiments, one or more features (for example, the ability to display an indication of a contextual object) can be disabled or unavailable when using the third-party user interface 1220 to interact with the system 110.

Figure 13:
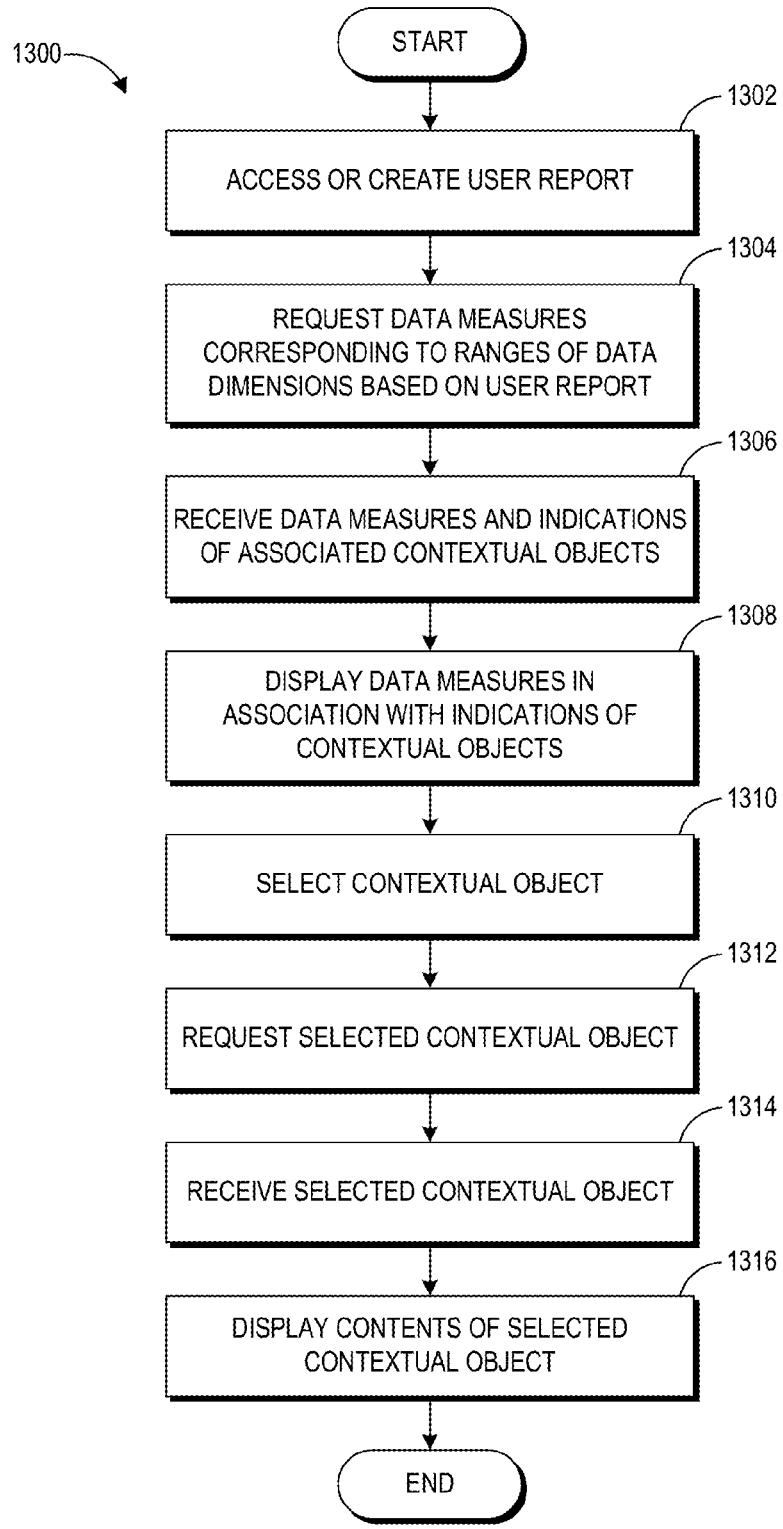
FIG. 13 depicts an embodiment of a user terminal data measures and contextual objects presentation process.

FIG. 13 depicts an embodiment of a user terminal data measures and contextual objects presentation process 1300. For convenience, the process 1300 is described as being implemented by the components of the computing environments 200 and 500A described above with respect to FIGS. 2 and 5A. However, the process 1300 is not limited as such and may be implemented by any other system described herein or components thereof, or other computing devices or systems comprising physical computer hardware and/or software.

At block 1302 of the process 1300, a user report can be accessed or created. In one example, a user of the user terminal 120A can cause the user terminal 120A to access a pre-existing user report corresponding to a particular set of data measures by indicating to access the pre-existing user report. In another example, a user of the user terminal 120A can cause the user terminal 120A to create a new user report by providing selected data dimensions and ranges of values of the data dimensions to be displayed in the new user report.

At block 1304, the data measures corresponding to ranges of data measures can be requested based on the user report. For instance, the user terminal 120A can transmit a request via the network 108 to the system 110 for a set of data measures to be displayed in the report. In response to the request, at block 1306, the set of data measures and indications of associated contextual objects can be received. For example, the user terminal 120A can received the requested data measures via the network 108 from the system 110.

At block 1308, the data measures can be displayed in association with indications of contextual objects. In one example, the user terminal 120A can display the data measures and any associated contextual objects on a user interface, such as the user interface 400. The indications of the contextual objects can be displayed alongside the associated data measures in the same cell of a report or nearby the associated data measures such that users can understand that each indication is associated with a particular data measure.

At block 1310, a contextual object can be selected. For instance, a user of the user terminal 120A can indicate to select a particular indication of a contextual object displayed by the user terminal 120A, causing the user terminal 120A to select the contextual object corresponding to the particular indication. At block 1312, the selected contextual object can be requested. The user terminal 120A can, for example, transmit a request via the network 108 to the system 110 for the particular contextual object by providing the dimension coordinates that identify the data measure associated with the contextual object. At block 1314, the selected contextual object can be received. For instance, the user terminal 120A can receive the contextual element via the network 108 from the system 110. At block 1316, the contents of the selected contextual object can be displayed. In one example, the user terminal 120A can display the contents (for example, one or more entries in the case of a discussion contextual object or details about an assigned task activity in the case of a task conceptual object) of the selected contextual object to the user.

Figure 14:
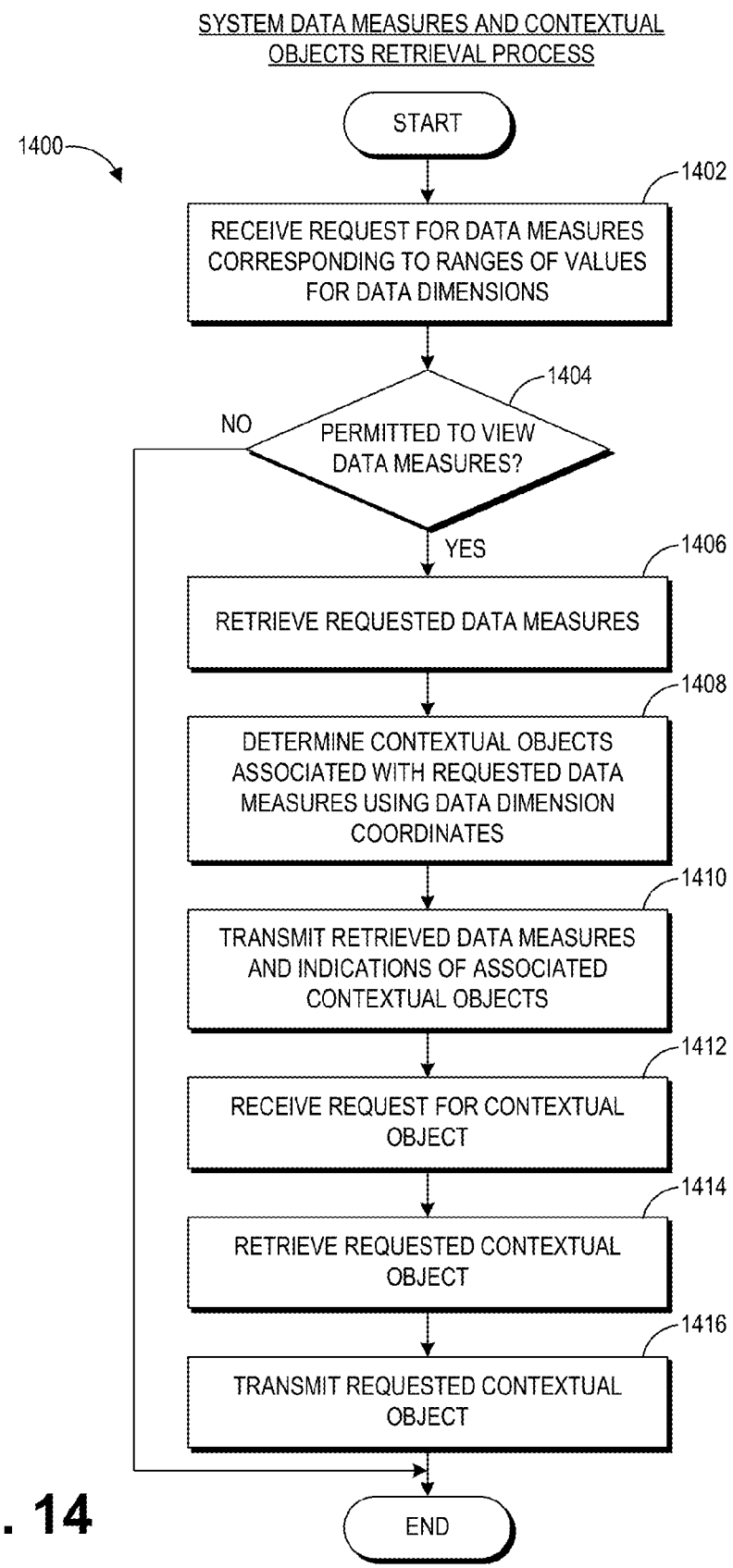
FIG. 14 depicts an embodiment of a system data measures and contextual objects retrieval process.

FIG. 14 depicts an embodiment of a system data measures and contextual objects retrieval process 1400. For convenience, the process 1400 is described as being implemented by the components of the computing environments 200 and 500A described above with respect to FIGS. 2 and 5A. However, the process 1400 is not limited as such and may be implemented by any other system described herein or components thereof, or other computing devices or systems comprising physical computer hardware and/or software.

At block 1402 of the process 1400, a request can be received for data measures corresponding to ranges of values for data dimensions. For example, the system 110 can receive a request via the network 108 from the user terminal 120A for a set of data measures. At block 1404, it can be decided whether the requestor is permitted to view the requested data measures. In one example, it can be decided whether a user of the user terminal 120A or the user terminal 120A may be permitted to view the requested data measures based on a comparison between security attribute for the user or the user terminal 120A and a security attribute for the requested data measures. If the requestor may not be permitted to view any of the data measures, the process 1400 may end. In some embodiments, however, the requestor can additionally be notified that the user or the user terminal 120A may not view the requested data measures.

If the requestor may be permitted to view any of the data measures, at block 1406, the viewable requested data measures can be retrieved. For instance, the system 110 can retrieve the viewable requested data measures from the measures storage 222. At block 1408, the contextual objects associated with the viewable requested data measures can be determined using the data dimension coordinates that uniquely identify the data measures. In one example, the system 110 can determine whether any contextual objects may be stored in the metadata storage 224 that have data dimension coordinates corresponding to the viewable requested data measures. At block 1410, the retrieved data measures and indications of associated contextual objects can be transmitted. For instance, the system 110 can transmit the retrieved data measures and indications of associate a contextual objects via the network 108 to the user terminal 120A.

At block 1412, a request for a contextual object can be received. The system 110 can, for example, receive a request for particular contextual object from the user terminal 120A via the network 108. At block 1414, the requested contextual object can be retrieved. In some embodiments, the requested contextual object may only be retrieved if the requestor may be permitted to view the data measure associated with the requested contextual object. In one example, the system 110 can retrieve the requested contextual object from the metadata storage 224 if the user or the user terminal 120A may be permitted to view the data measure associated with the requested contextual object. At block 1416, the requested contextual object can be transmitted. For instance, the system 110 can transmit the requested contextual object to the user terminal 120A via the network 108.

Figure 15:
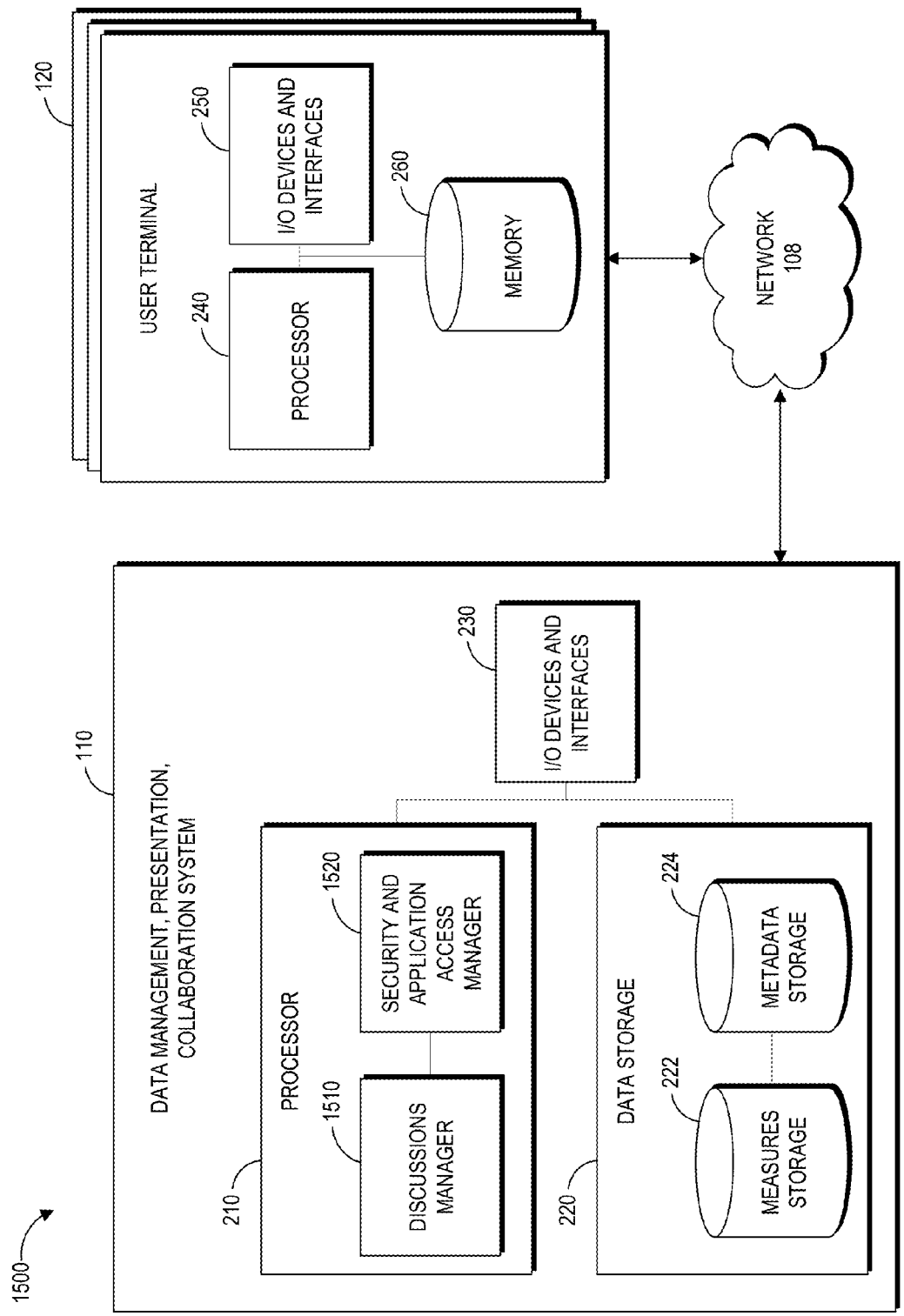
FIG. 15 depicts an embodiment of components of the computing environment of FIG. 1.

FIG. 15 depicts an embodiment 1500 of components of the computing environment 100 of FIG. 1, including the system 110 and the user terminals 120. Moreover, the embodiment 1500 can be similar to the embodiment 200 described with respect to FIG. 2; however, the system 110 can further include a discussions manager 1510 and a security and application access manager 1520.

Figure 16:
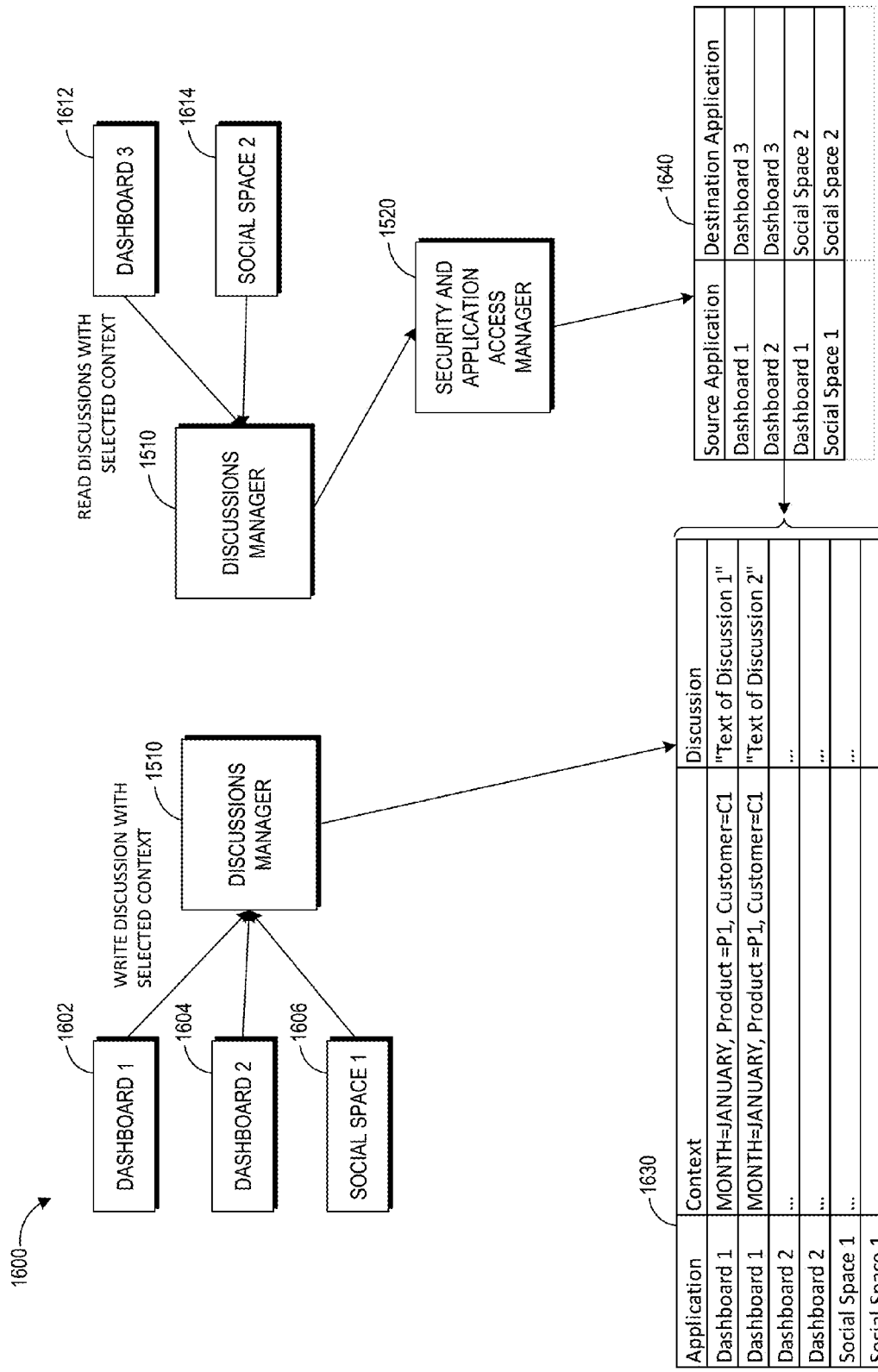
FIG. 16 depicts example communications in a computing environment including user terminals configured to communicate through an intermediary system.

In an embodiment, such as in the illustrated embodiment 1600 of FIG. 16, the user of a particular user terminal of the user terminals 120 can access an application (sometimes referred to as a user interface) on the particular user terminal. The application can be an application such as an analytical dashboard, collaborative planning space, or social space (for example, dashboards 1602 or 1604 or social space 1606). The user of the particular user terminal can indicate a series of selections of structured information displayed via the application that may define the context (sometimes referred to as the data dimension coordinates), such as MONTH=January, Product=P1, and Customer=C1. The particular user terminal can then submit a request to the discussions manager 1510 to retrieve discussions that may have been previously generated, which can match the selected context. The system 110 may, in response, transmit retrieved discussions to the particular user terminal and cause the particular user terminal to display one or more of the retrieved discussions in a discussion contextual object on the particular user terminal. The user can add a comment to an existing discussion or create a new discussion. In some embodiments, this existing or new discussion can further be listed first on a list of discussions displayed to the user or other users as a result. The particular user terminal may submit the comment or new discussion to the discussions manager 1510, which can save this information in the metadata storage 224.

In an embodiment, such as in the illustrated embodiment 1600, the user of a certain user terminal of the user terminals 120 can retrieve a generated discussion from the discussions manager 1510 via an application (for example, the dashboard 1612 or social space 1614), if one or more of a set of conditions may be satisfied (for example, in some implementations, if all of the conditions are satisfied). A first condition can be whether the user has permissions to see the data associated with a defined context. For instance, if the user may not have been granted permission to see the data for product P1, the user may not be able to view or edit a discussion related to the product P1. The security and application access manager 1520 can manage access to the data and discussions by the user terminals 120. A second condition can be whether the user selected the data that generated the context to which the discussion relates or selected a "Total" item for the dimension or element. A third condition can be whether administrator may have defined an association between two applications that may enable a data transfer between the applications. In some cases, without such an association, even if the same context may be generated, the discussions may not be presented to a requesting user. A fourth condition can be whether the user may have been granted access to a source application. The security and application access manager 1520 may manage access to the source application by the user terminals 120.

Advantageously, in some implementations, the discussions manager 1510 and the security and application access manager 1520 can enable discussions to be activated on different applications of the user terminals 120 using the discussion contexts table 1630 and the application communications table 1640. The discussions can be related to a structured data context, which may be used by the different applications of the user terminals 120 to retrieve the discussions in a way that increases the collaboration capabilities (for example, in substantially real-time) among users of the user terminals 120.

Figure 17:
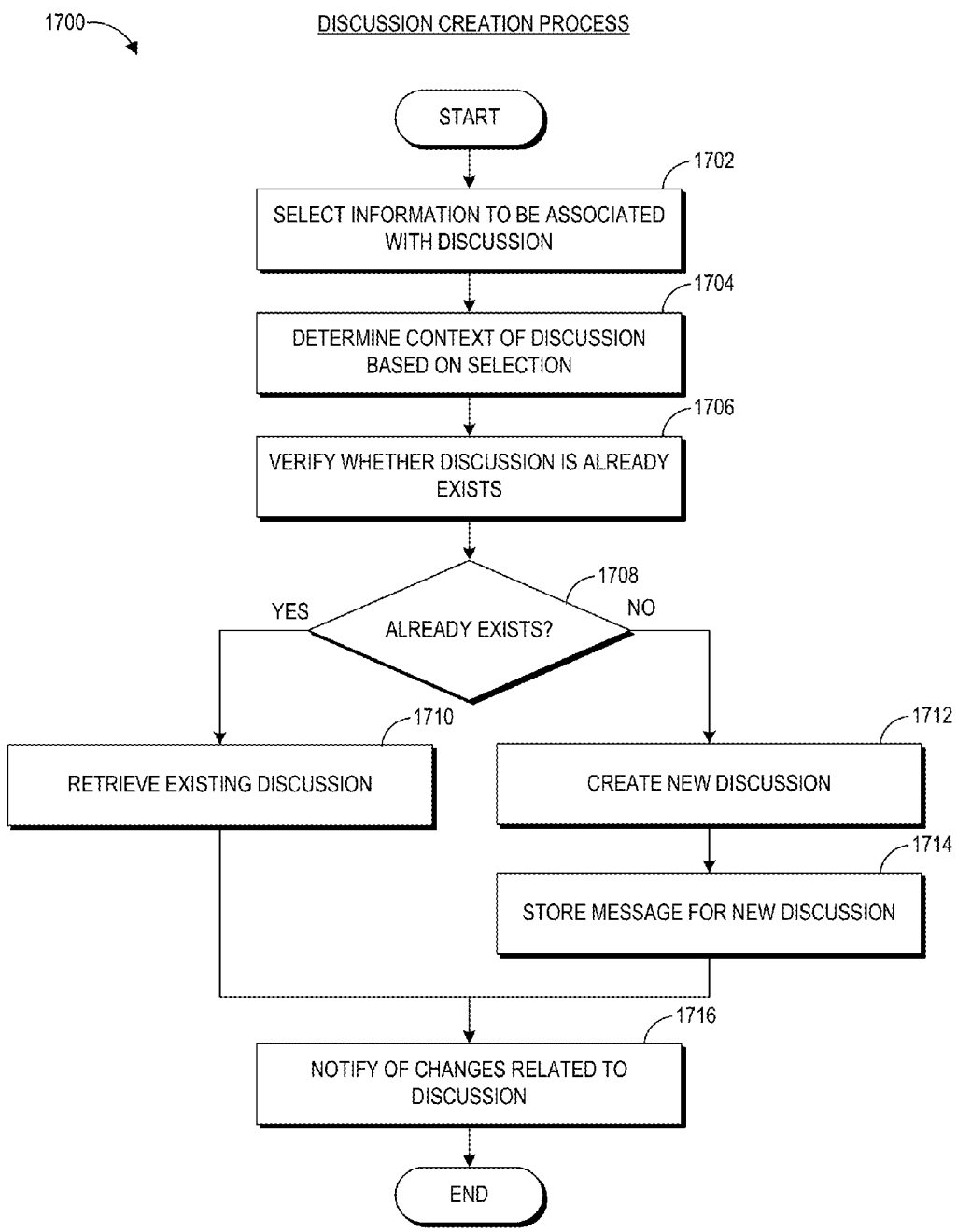
FIG. 17 depicts an embodiment of a discussion creation process.

FIG. 17 depicts an embodiment of a discussion creation process 1700. For convenience, the process 1700 is described as being implemented by the components of the computing environments 200 and 1500 described above with respect to FIGS. 2 and 15. However, the process 1700 is not limited as such and may be implemented by any other system described herein or components thereof, or other computing devices or systems comprising physical computer hardware and/or software.

At block 1702 of the process 1700, information to be associated with the discussion can be selected. For example, a particular user terminal of the user terminals 120 can select structured information displayed on an application form, such as an analytical dashboard, collaborative planning space, or social space, in response to an input from a user. At block 1704, context of the discussion can be determined based on the selection. For instance, the system 110 can determine the selected context to be MONTH=January, Product=P1, and Customer=C1.

At block 1706, it can be verified whether a discussion already exists. In one example, the discussions manager 1510 can verify if a discussion may exist for the determined context. If it is determined at block 1708 that a discussion already exists, at block 1710, the discussions manager 1510 can retrieve one or more existing discussions that may match the determined context. If it is determined at block 1708 that a discussion does not already exist, at block 1712, a new discussion can be created. For example, the discussions manager 1510 can create a new discussion using the determined context. At block 1714, a message for the new discussion can be stored. For instance, the message for the new discussion can be stored, in the metadata storage 224, by the discussions manager 1510 in association with the context and information about the source application that generated the discussion. At block 1716, changes related to the discussion can be notified to other components. In one example, the system 110 can notify one or more of the user terminals 120 of the new discussion or revisions to the existing discussion.

Figure 18:
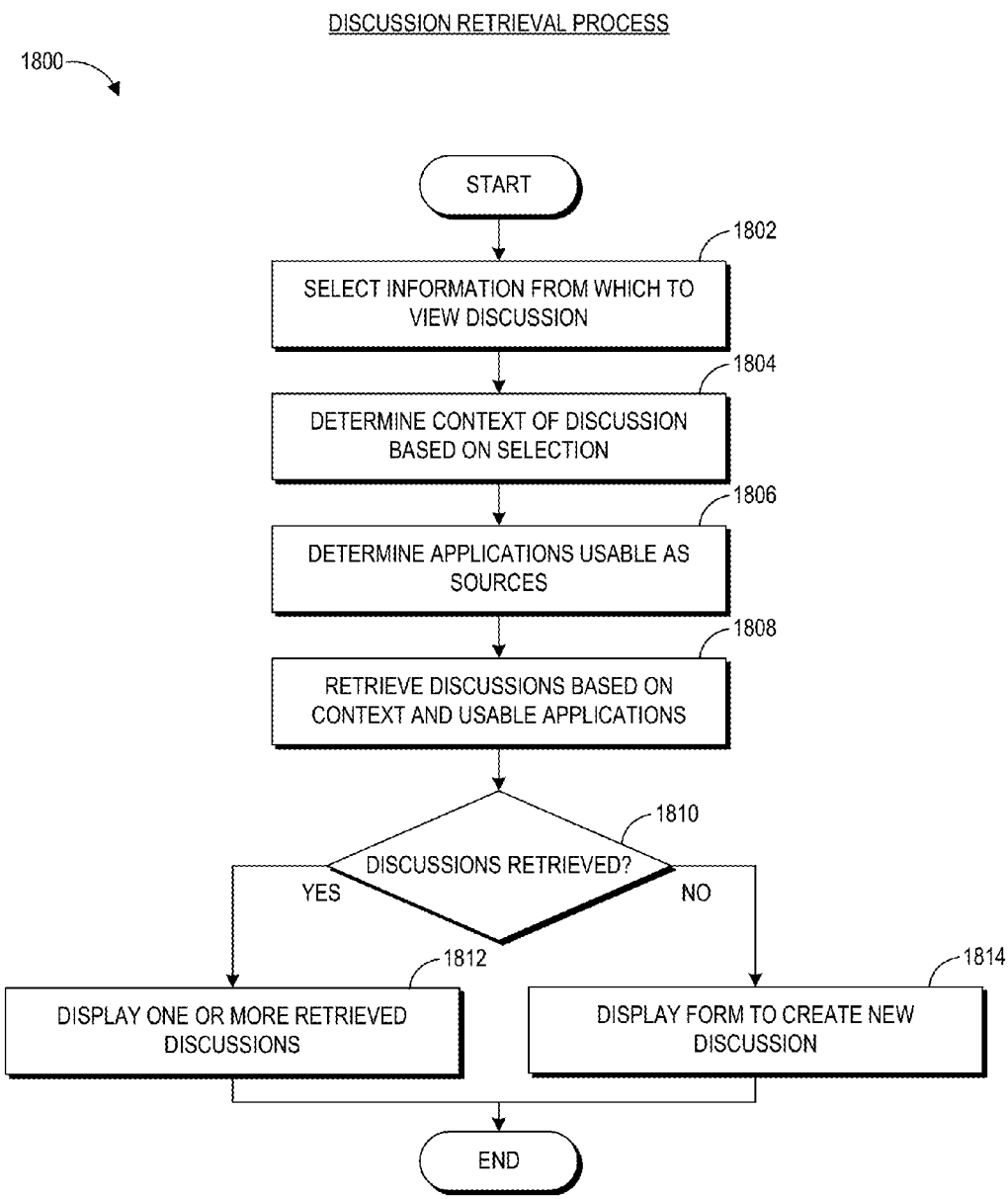
FIG. 18 depicts an embodiment of a discussion retrieval process.

FIG. 18 depicts an embodiment of a discussion retrieval process 1800. For convenience, the process 1800 is described as being implemented by the components of the computing environments 200 and 1500 described above with respect to FIGS. 2 and 15. However, the process 1800 is not limited as such and may be implemented by any other system described herein or components thereof, or other computing devices or systems comprising physical computer hardware and/or software.

At block 1802 of the process 1800, information from which to view a discussion can be selected. For instance, a particular user terminal of the user terminals 120 can select structured information displayed on an application form, such as an analytical dashboard, collaborative planning space, or social space, in response to an input from a user. The selection can indicate a desire to view the discussion. At block 1804, context of the discussion can be determined based on the selection. For instance, the system 110 can determine the selected context to be MONTH=January, Product=P1, and Customer=C1.

At block 1806, applications usable as sources can be determined. For example, the discussions manager 1510 can examine a list of applications that can be used as sources to determine requested information. At block 1808, discussions can be retrieved based on the matching context and usable applications. In one example, the discussions manager 1510 can retrieve from the metadata storage 224 the discussions having the matching context and usable applications. At block 1810, it is determined whether at least one discussion may have been retrieved. For instance, the system 110 or the particular user terminal can determine whether discussions were retrieved at block 1808. If discussions were retrieved, at block 1812, one or more of the retrieved discussions can be displayed. In one example, one or more of the retrieved discussions can be displayed on the particular user terminal. On the other hand, if no discussions were retrieved, at block 1814, a form can be displayed to create a new discussion. For example, a form may be displayed on the particular user terminal to permit a new discussion to be created that can be related to the determined context.

Computing System

Figure 19:
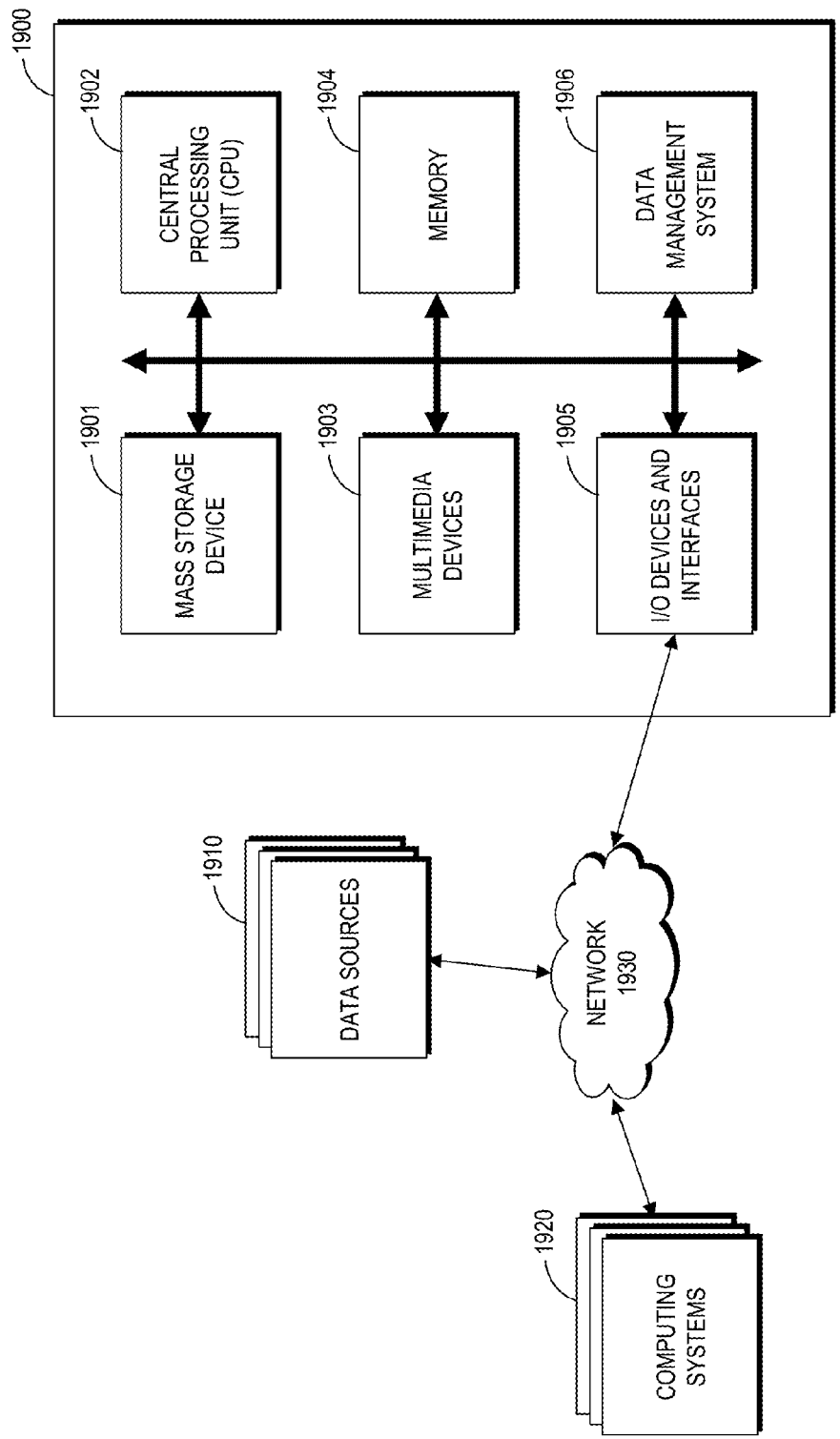
FIG. 19 is a block diagram depicting an embodiment of a computer hardware system configured to run software for implementing one or more embodiments described herein.

FIG. 19 is a block diagram depicting an embodiment of a computer hardware system 1900 configured to run software for implementing one or more embodiments of the system 110, the user terminals 120, and the administrator terminals 130 described herein.

In some embodiments, the computer clients, servers, systems, and/or terminals described above take the form of a computing system 1900 illustrated in FIG. 19, which is a block diagram of one embodiment of a computing system that is in communication with one or more computing systems 1920 and/or one or more data sources 1910 via one or more networks 1930. The computing system 1900 including the data management system module 1906 may be used to implement one or more of the systems and methods described herein. In addition, in one embodiment, the computing system 1900 may be configured to manage access or administer a software application. While FIG. 19 illustrates one embodiment of a computing system 1900, it is recognized that the functionality provided for in the components and modules of computing system 1900 may be combined into fewer components and modules or further separated into additional components and modules.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the computing system 1900 also comprises a mainframe computer suitable for controlling and/or communicating with large databases, performing high volume transaction processing, and generating reports from large databases. The computing system 1900 also comprises a central processing unit ("CPU") 1902, which may comprise a conventional microprocessor. The computing system 1900 further comprises a memory 1904, such as random access memory ("RAM") for temporary storage of information and/or a read only memory ("ROM") for permanent storage of information, and a mass storage device 1901, such as a hard drive, diskette, or optical media storage device. Typically, the modules of the computing system 1900 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1900 comprises one or more commonly available input/output (I/O) devices and interfaces 1905, such as a keyboard, mouse, touchpad, and printer. In one embodiment, the I/O devices and interfaces 1905 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 1905 comprise a microphone and/or motion sensor that allow a user to generate input to the computing system 1900 using sounds, voice, motion, gestures, or the like. In the embodiment of FIG. 19, the I/O devices and interfaces 1905 also provide a communications interface to various external devices. The computing system 1900 may also comprise one or more multimedia devices 1903, such as speakers, video cards, graphics accelerators, and microphones, for example.

The computing system 1900 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 1900 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 1900 may be controlled by a proprietary operating system. Conventional operating systems control and schedule computer processes for execution, perform memory management, provide file system, networking, and I/O services, and provide a user interface, such as a graphical user interface ("GUI"), among other things.

In the embodiment of FIG. 19, the computing system 1900 is coupled to a network 1930, such as a LAN, WAN, or the Internet, for example, via a wired, wireless, or combination of wired and wireless, communication link. The network 1930 communicates with various computing devices and/or other electronic devices via wired or wireless communication links. In the embodiment of FIG. 19, the network 1930 is communicating with one or more computing systems 1920 and/or one or more data sources 1910.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1900 may comprise a physical or logical connection established between a remote microprocessor and a mainframe host computer for the express purpose of uploading, downloading, or viewing interactive data and databases online in real time. The remote microprocessor may be operated by an entity operating the computer system 1900, including the client server systems or the main server system, and/or may be operated by one or more of the data sources 1910 and/or one or more of the computing systems 1920. In some embodiments, terminal emulation software may be used on the microprocessor for participating in the micro-mainframe link.

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

In addition to the systems that are illustrated in FIG. 19, the network 1930 may communicate with other data sources or other computing devices. The computing system 1900 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Terms such as "substantially," "about," "approximately," or the like as used in referring to a relationship between two elements is intended to reflect not only an exact relationship but also variances in that relationship that may be due to various factors such as the effects of environmental conditions, common error tolerances, or the like. It should further be understood that although some values or other relationships may be expressed herein without a modifier, these values or other relationships may also be exact or may include a degree of variation due to various factors such as the effects of environmental conditions, common error tolerances, or the like. As one example, one or more factors can influence the real-time communication capabilities in the computing environments 100 or 500A. For instance, the one or more factors can include a size of the infrastructure of the system 110 or computing environment 500A, a size of the database(s) of the system 110, an amount of data stored in the database(s) of the system 110, a technology of the database(s) of the system 110, the speed of the network 108, and the processing speeds of the user terminals 120A and 120B and system 110.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A non-transitory computer-readable storage medium having a computer program stored thereon for causing a suitably programmed system to process by one or more computer processors computer-program code by performing a method when the computer-program code is executed on the suitably programmed system, the method facilitating collaboration, the method comprising:

processing, by the suitably programmed system, a first request from a first user terminal of a plurality of user terminals to associate a first contextual object with a data measure mapped to a multi-dimensional data model, the first contextual object comprising information received by the first user terminal from a first user of the first user terminal, the multi-dimensional data model configured for access by online analytical processing (OLAP) applications;

determining, by the suitably programmed system, coordinates of a plurality of data dimensions of the multi-dimensional data model that uniquely identify the data measure;

storing, by the suitably programmed system, in an electronic data storage the first contextual object in association with the coordinates of the plurality of data dimensions of the multi-dimensional data model that uniquely identify the data measure;

receiving, by the suitably programmed system, a second request from a second user terminal of the plurality of user terminals, the second request dynamically generated based on a value of the data measure being displayed by the second user terminal to a second user of the second user terminal, the second request indicating the coordinates of the plurality of data dimensions of the multi-dimensional data model that uniquely identify the data measure, the second request configured to identify contextual objects associated with the coordinates;

determining, by the suitably programmed system, an existence of contextual objects that are associated with the coordinates indicated in the second request;

retrieving, by the suitably programmed system, the first contextual object from the electronic data storage using the coordinates of the plurality of data dimensions of the multi-dimensional data model;

transmitting, by the suitably programmed system, to the second user terminal an indication of the first contextual object for display by the second user terminal in juxtaposition with the value of the data measure; and transmitting, by the suitably programmed system, to the second user terminal the first contextual object.

2. The non-transitory computer-readable storage medium of claim 1, wherein said transmitting the first contextual object is based on determining that the second user is permitted to view the first contextual object, wherein permission to view the first contextual object is based on determining that the second user is permitted to view a source application that generated the data measure.

3. The non-transitory computer-readable storage medium of claim 1, wherein said transmitting to the second user terminal the first contextual object further comprises transmitting an indication of a third contextual object embedded in the first contextual object, the indication of the third contextual object configured for display by the second user terminal, the third contextual object associated with the coordinates of the plurality of data dimensions of the multi-dimensional data model that uniquely identify the data measure.

4. The non-transitory computer-readable storage medium of claim 1, wherein the method performed when the computer-program code is executed on the suitably programmed system further comprises:

transmitting, by the suitably programmed system, to the first user terminal a first indication of the first contextual object for display by the first user terminal in association with the value of the data measure; and transmitting, by the suitably programmed system, to the first user terminal a second indication of the first contextual object for display by the first user terminal in place of the first indication, the second indication denoting that contents of the first contextual object have changed relative to the contents of the first contextual object when the first indication is displayed.

5. The non-transitory computer-readable storage medium of claim 1, wherein the value of the data measure is configured to vary over time based on a measured value indicative of performance of an entity, and wherein the method performed when the computer-program code is executed on the suitably programmed system further comprises:
   transmitting, by the suitably programmed system, the value of the data measure to the second terminal at a first time; and
   transmitting, by the suitably programmed system, the value of the data measure to the second terminal at a second time subsequent to the first time when the value of the data measure has changed.

6. The non-transitory computer-readable storage medium of claim 1, wherein the information received by the first user terminal from the first user comprises text input by the first user.

7. The non-transitory computer-readable storage medium of claim 1, wherein in response to determining that the first contextual object comprises a link to a third contextual object, transmitting, by the suitably programmed system, to the second user terminal a list of contextual objects linked to the first contextual object to cause the second user terminal to display the list on a user interface displayed on a display, the list including the third contextual object.

8. The non-transitory computer-readable storage medium of claim 7, wherein the link comprises a navigable link that when selected, as a result of an input by the second user, causes the display to display contents of the third contextual object.

9. The non-transitory computer-readable storage medium of claim 1, wherein the first contextual object comprises at least two of text input by the first user, a link to a task object, a link to a report, and a link to a user social space.

10. The non-transitory computer-readable storage medium of claim 1, wherein said transmitting to the second user terminal the indication of the first contextual object comprises transmitting to the second user terminal the indication of the first contextual object to cause the second user terminal to display, in a report on a user interface displayed on a display, the indication of the first contextual object within the same cell of the report as the value of the data measure.

11. The non-transitory computer-readable storage medium of claim 1, wherein said retrieving the first contextual object and said transmitting to the second user terminal the indication of the first contextual object are performed in response to determining that the second user is permitted to view the value of the data measure.

12. The non-transitory computer-readable storage medium of claim 1, wherein the method performed when the computer-program code is executed on the suitably programmed system further comprises retrieving, by the suitably programmed system, the data measure from the electronic data storage based on the second request from the second user terminal for a plurality of data measures, the data measure stored in a relational database structure.

13. The non-transitory computer-readable storage medium of claim 1, wherein said processing is performed substantially in real-time with said transmitting the indication of the first contextual object.

14. The non-transitory computer-readable storage medium of claim 1, wherein the multi-dimensional data model comprises at least three dimensions.

15. The non-transitory computer-readable storage medium of claim 1, wherein said transmitting to the second user terminal the first contextual object is performed in response to a third request for the first contextual object from the second user terminal.

16. The non-transitory computer-readable storage medium of claim 1, wherein the method performed when the computer-program code is executed on the suitably programmed system further comprises:
   retrieving, by the suitably programmed system, a second contextual object from the electronic data storage using the coordinates of the plurality of data dimensions of the multi-dimensional data model; and
   transmitting, by the suitably programmed system, to the second user terminal an indication of the second contextual object for display by the second user terminal in juxtaposition with the value of the data measure and the indication of the first contextual object.

17. The non-transitory computer-readable storage medium of claim 1, wherein the indication of the first contextual object comprises a parameter calculated based on the value of the data measure.

18. A computer-implemented method for facilitating collaboration, the computer-implemented method comprising:
   processing, by a computer system, a first request from a first user terminal of a plurality of user terminals to associate a first contextual object with a data measure mapped to a multi-dimensional data model, the first contextual object comprising information received by the first user terminal from a first user of the first user terminal, the multi-dimensional data model configured for access by online analytical processing (OLAP) applications;
   determining, by the computer system, coordinates of a plurality of data dimensions of the multi-dimensional data model that uniquely identify the data measure;
   storing, by the computer system, in an electronic data storage the first contextual object in association with the coordinates of the plurality of data dimensions of the multi-dimensional data model that uniquely identify the data measure;
   receiving, by the computer system, a second request from a second user terminal of the plurality of user terminals, the second request dynamically generated based on a value of the data measure being displayed by the second user terminal to a second user of the second user terminal, the second request indicating the coordinates of the plurality of data dimensions of the multi-dimensional data model that uniquely identify the data measure, the second request configured to identify contextual objects associated with the coordinates;
   determining, by the computer system, an existence of contextual objects that are associated with the coordinates indicated in the second request;
   retrieving, by the computer system, the first contextual object from the electronic data storage using the coordinates of the plurality of data dimensions of the multi-dimensional data model;
   transmitting, by the computer system, to the second user terminal an indication of the first contextual object for display by the second user terminal in juxtaposition with the value of the data measure; and transmitting, by the computer system, to the second user terminal the first contextual object,
wherein the computer system comprises a computer processor and electronic memory.

19. The computer-implemented method of claim 18, wherein the value of the data measure is configured to vary over time based on a measured value indicative of performance of an entity, and further comprising:
transmitting, by the computer system, the value of the data measure to the second terminal at a first time; and
transmitting, by the computer system, the value of the data measure to the second terminal at a second time subsequent to the first time when the value of the data measure has changed.

20. The computer-implemented method of claim 18, wherein said transmitting to the second user terminal the indication of the first contextual object comprises transmitting to the second user terminal the indication of the first contextual object to cause the second user terminal to display, on a user interface displayed on a display, the indication of the first contextual object at a position within a maximum distance from the value of the data measure.

* * * * *